United States Patent [19]
Takashima

[11] Patent Number: 5,931,927
[45] Date of Patent: Aug. 3, 1999

[54] DEVICE FOR REDUCING THE FLUCTUATION OF POWER SUPPLY VOLTAGE DUE TO INDUCTANCE BY INVERTING BITS IN GROUPS OF DATA LINES

[75] Inventor: Daisaburo Takashima, Yokohama, Japan

[73] Assignee: Kabushiki Kaisha Toshiba, Kawasaki, Japan

[21] Appl. No.: 08/779,033

[22] Filed: Jan. 6, 1997

[30] Foreign Application Priority Data

Jan. 8, 1996 [JP] Japan .................................. 8-000826
Oct. 24, 1996 [JP] Japan .................................. 8-282497

[51] Int. Cl.$^6$ .................................................. H05K 9/00
[52] U.S. Cl. ............................... 710/65; 713/300; 174/32
[58] Field of Search ................................ 174/32; 307/30, 307/32, 33, 34; 326/21, 26; 395/885; 710/65; 713/300

[56] References Cited

U.S. PATENT DOCUMENTS

| 4,470,112 | 9/1984 | Dimmick | 364/200 |
| 5,200,979 | 4/1993 | Harris | 375/19 |
| 5,655,957 | 8/1997 | Marlow et al. | 327/67 |

FOREIGN PATENT DOCUMENTS 6-202775  7/1994  Japan .

OTHER PUBLICATIONS

Mircea R. Stan, et al. "Bus–Invert Coding for Low–Power I/O", IEEE Transactions On Very Large Scale Integration (VLSI) Systems, vol. 3, No. 1, Mar. 1995.

"Delta–I Simultaneous Switching" IBM TDB, pp. 2084–2053, Sep. 1984.

"Non–Volatile Pass Transistor Logic" IBM TDB, pp. 5918–5919, Mar. 1985.

"Coding for Delta I Reduction" IBM TDB, pp. 215–218, Apr. 1988.

"Logical Technique for Reducing Delta–I Noise Caused by Simultaneous Switching of Off C–Chip Drivers" IBM TDB, pp. 149–150, Feb. 1991.

*Primary Examiner*—Thomas C. Lee
*Assistant Examiner*—Harold Kim
*Attorney, Agent, or Firm*—Oblon, Spivak, McClelland, Maier & Neustadt, P.C.

[57] ABSTRACT

An output device comprises in-chip data lines of an m-bit (m is an integer of eight or more) configuration for transferring m-bit data containing 1 bits and/or 0 bits, m in-chip output circuits for respectively outputting m bits on the in-chip data lines to m external output pins, decision means, provided for each of n (n is an integer of two or more) groups into which the in-chip data lines and the in-chip output circuits are divided, for deciding whether all bits on each of the n groups of data lines are to be inverted or not on the basis of m-bit data, data inversion circuits provided between the in-chip data lines and the in-chip output circuits in each of at least (n−1) groups and responsive to an output of the decision means for inverting all bits in data on the corresponding in-chip data lines, and inversion information output circuits for outputting to external output pins information indicating whether data in the (n−1) groups have been inverted or not.

15 Claims, 27 Drawing Sheets

○ NUMBER OF OUTPUT PINS m
○ NUMBER OF VCC VSS PINS IS LARGE

○ NUMBER OF OUTPUT PINS 2m
○ NUMBER OF VCC VSS PINS IS SMALL

| D3 | D2 | D1 | D0 | Pi |
|---|---|---|---|---|
| 0 | 0 | 0 | 0 | 0 |
| 0 | 0 | 0 | 1 | 0 |
| 0 | 0 | 1 | 0 | 0 |
| 0 | 0 | 1 | 1 | 0 |
| 0 | 1 | 0 | 0 | 0 |
| 0 | 1 | 0 | 1 | 0 |
| 0 | 1 | 1 | 0 | 0 |
| 0 | 1 | 1 | 1 | 1 |
| 1 | 0 | 0 | 0 | 0 |
| 1 | 0 | 0 | 0 | 0 |
| 1 | 0 | 1 | 0 | 0 |
| 1 | 0 | 1 | 1 | 1 |
| 1 | 1 | 0 | 0 | 0 |
| 1 | 1 | 0 | 0 | 1 |
| 1 | 1 | 1 | 0 | 1 |
| 1 | 1 | 1 | 1 | 1 |
FIG. 4A
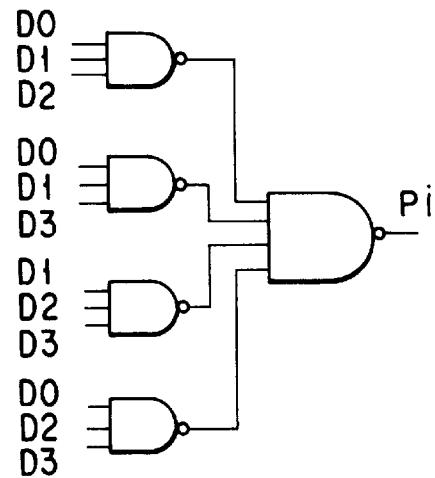
FIG. 4B
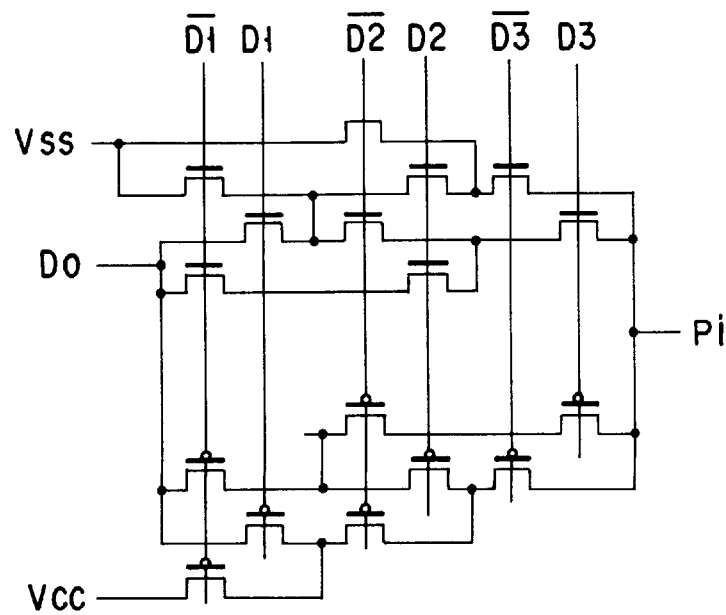
FIG. 4C

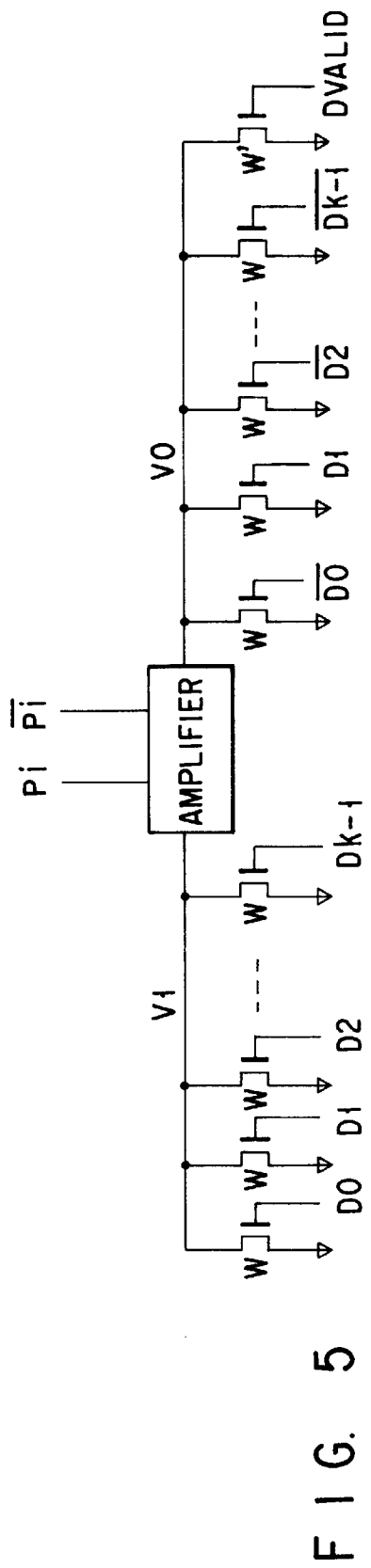
F I G. 5
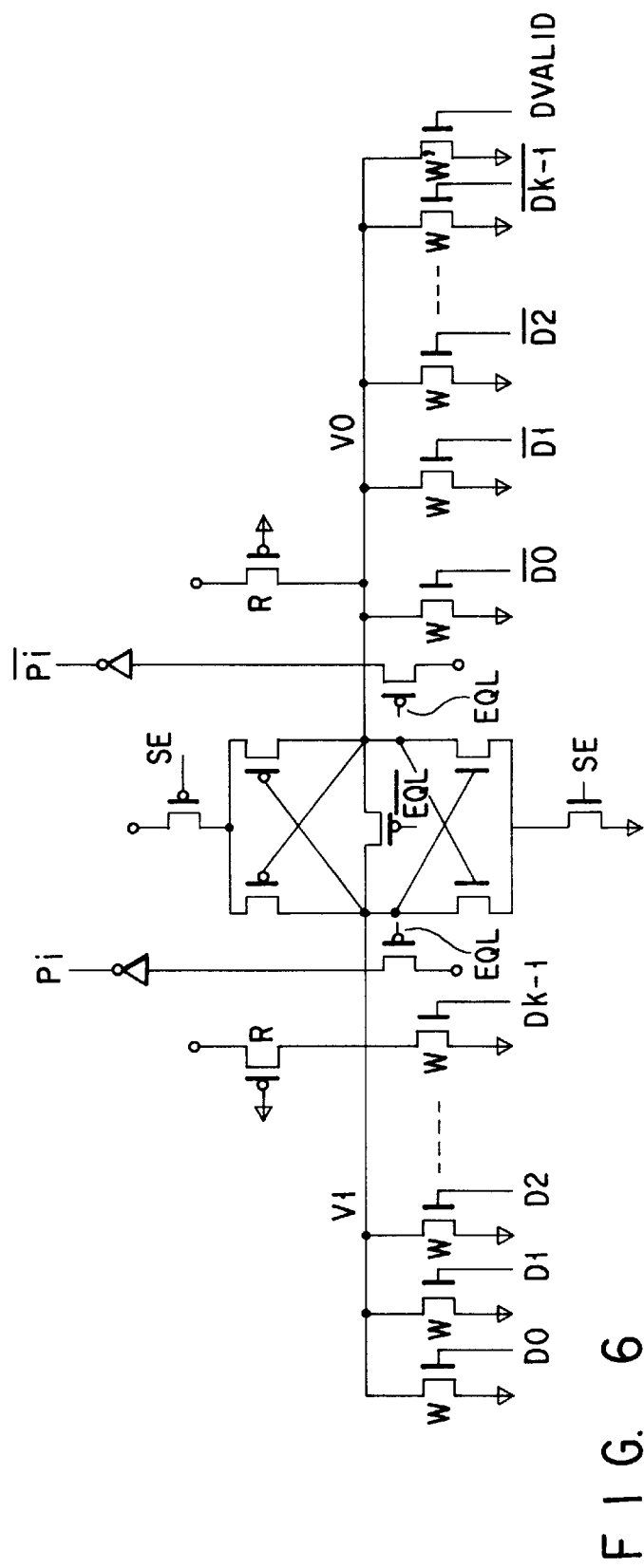
F I G. 6

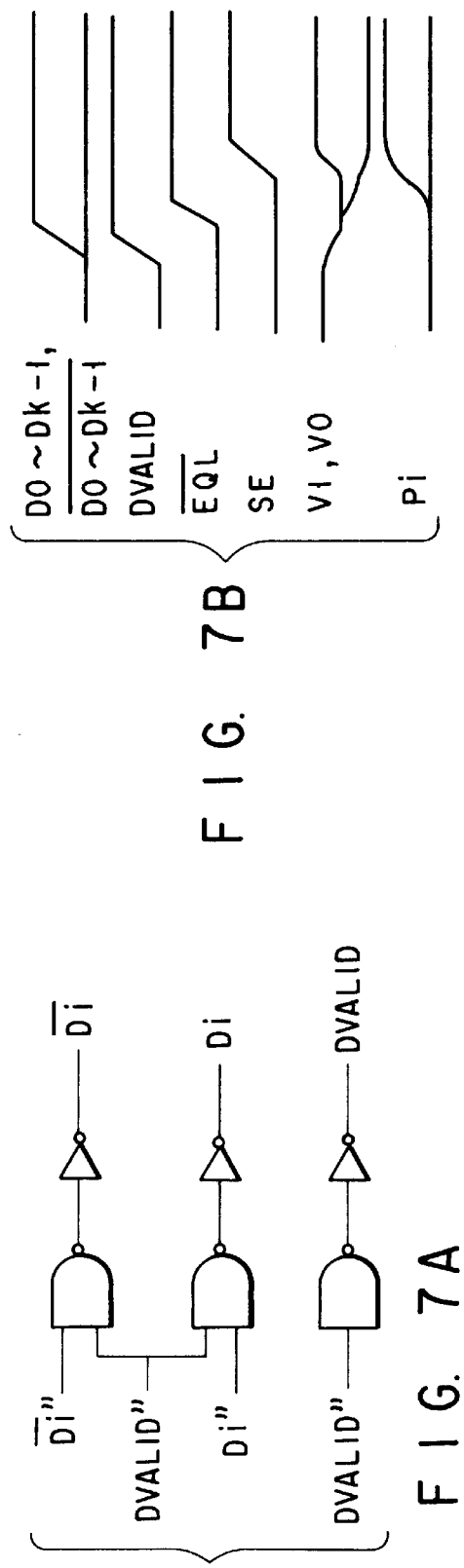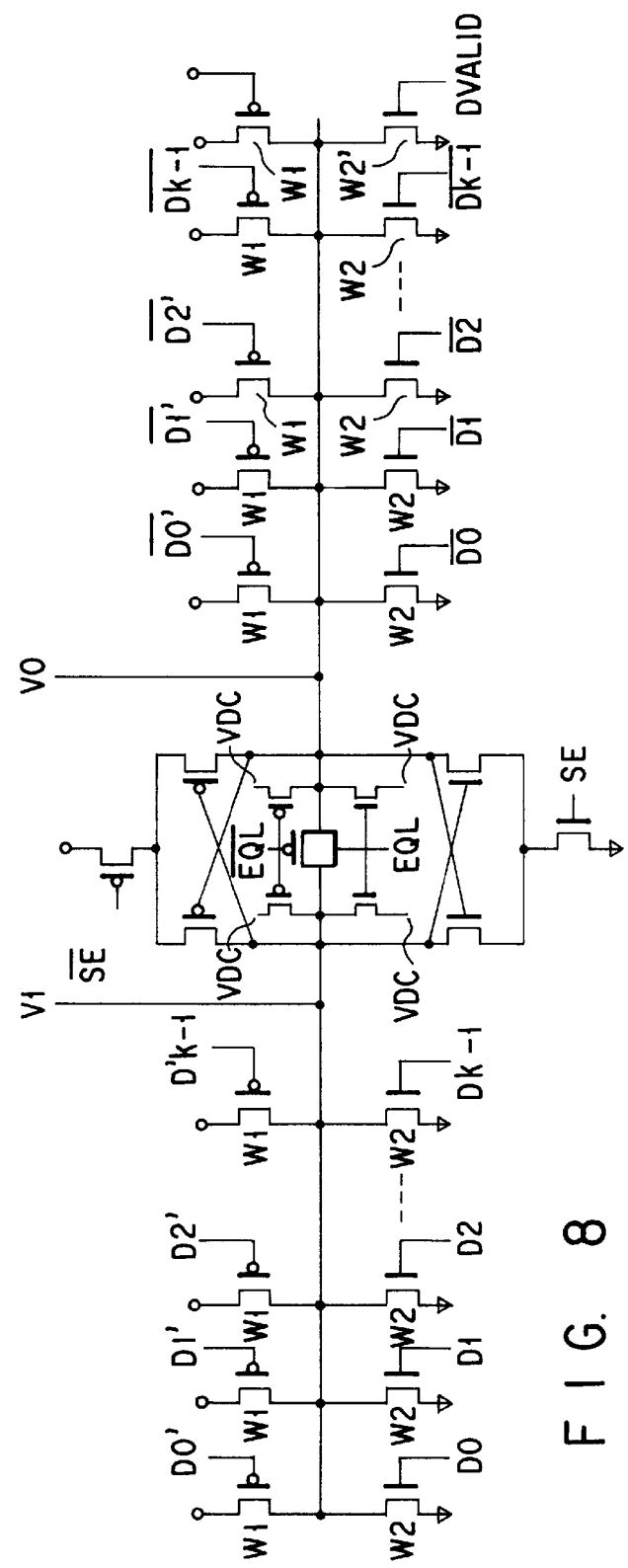
FIG. 7A
FIG. 7B
FIG. 8

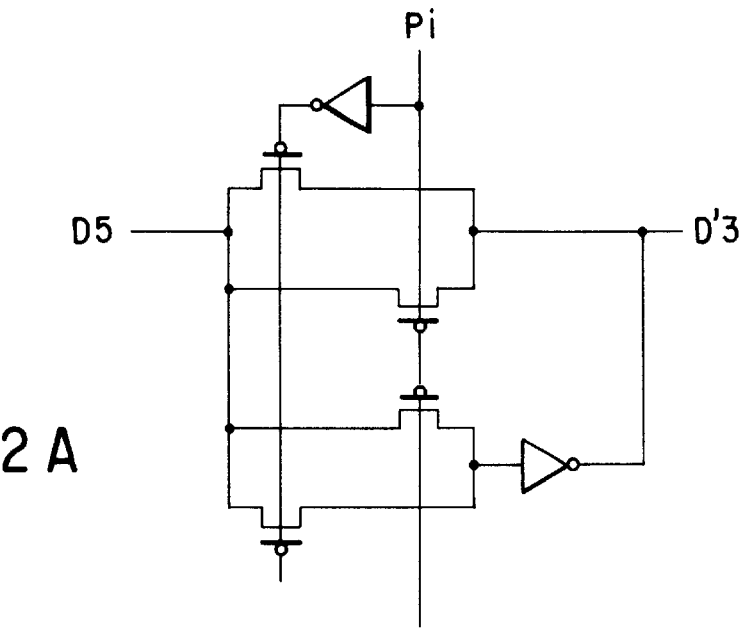
F I G. 12A
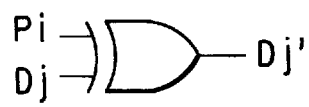
F I G. 12B
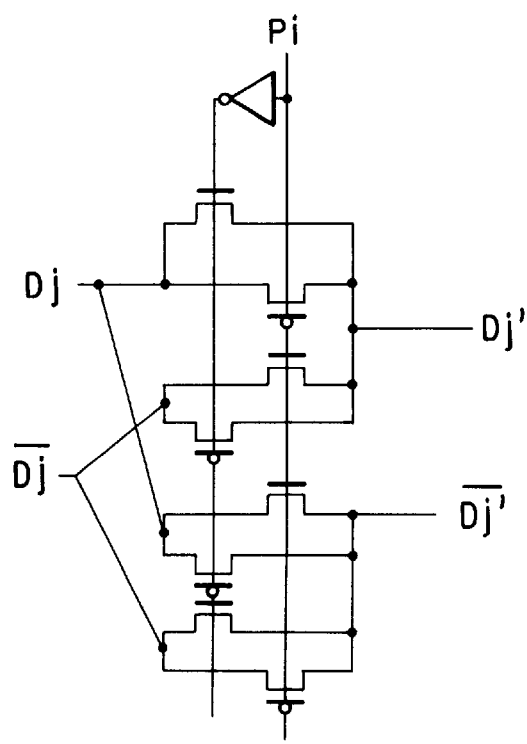
F I G. 12C

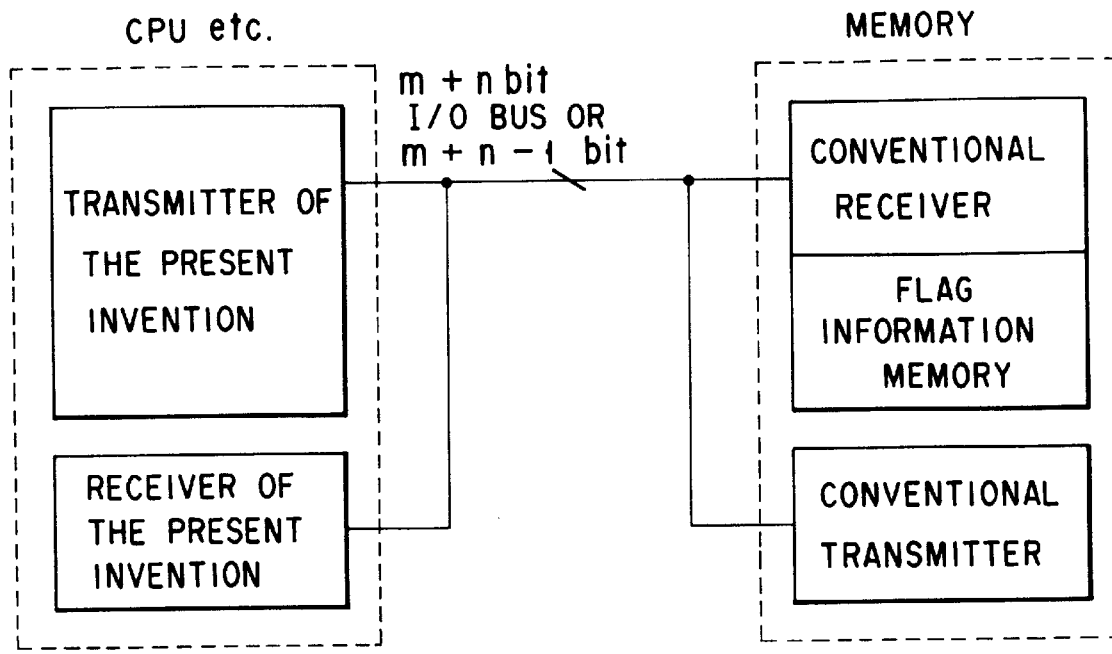
F I G. 16A
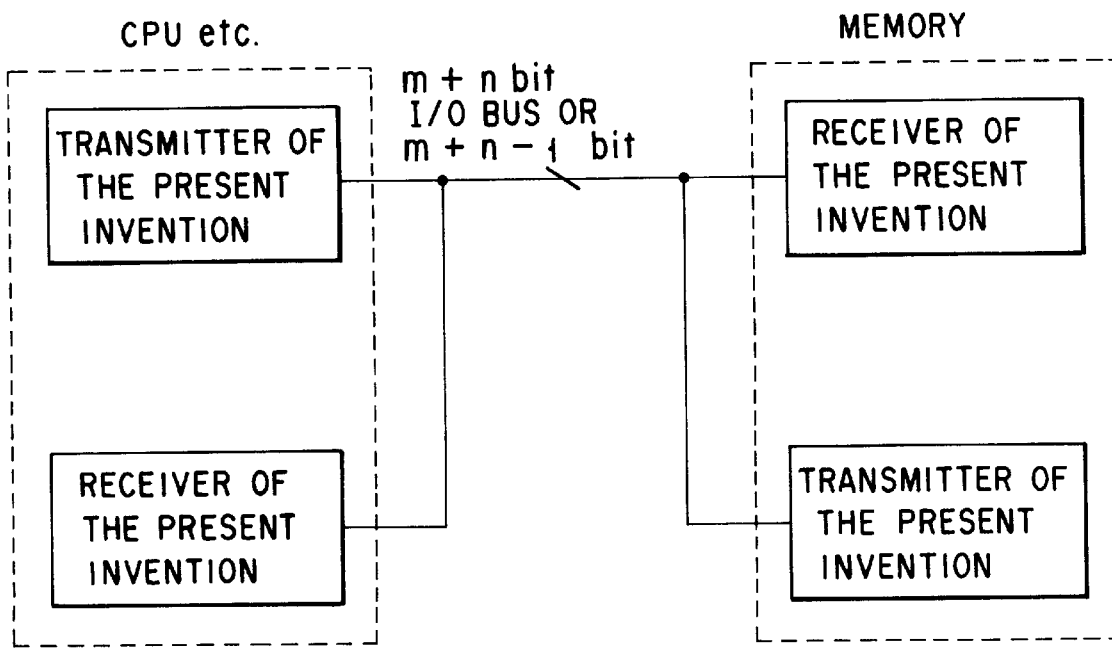
F I G. 16B

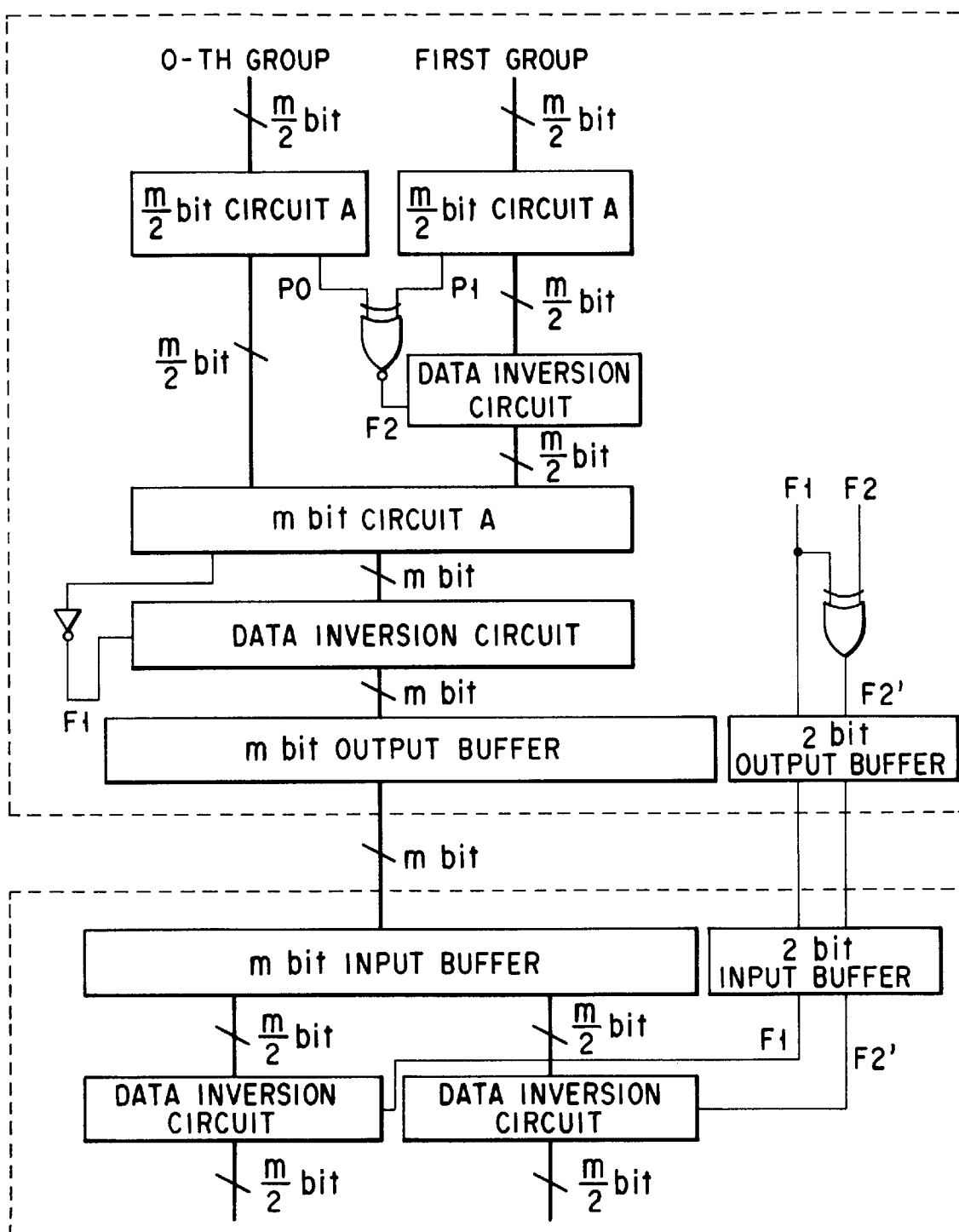
F I G. 22

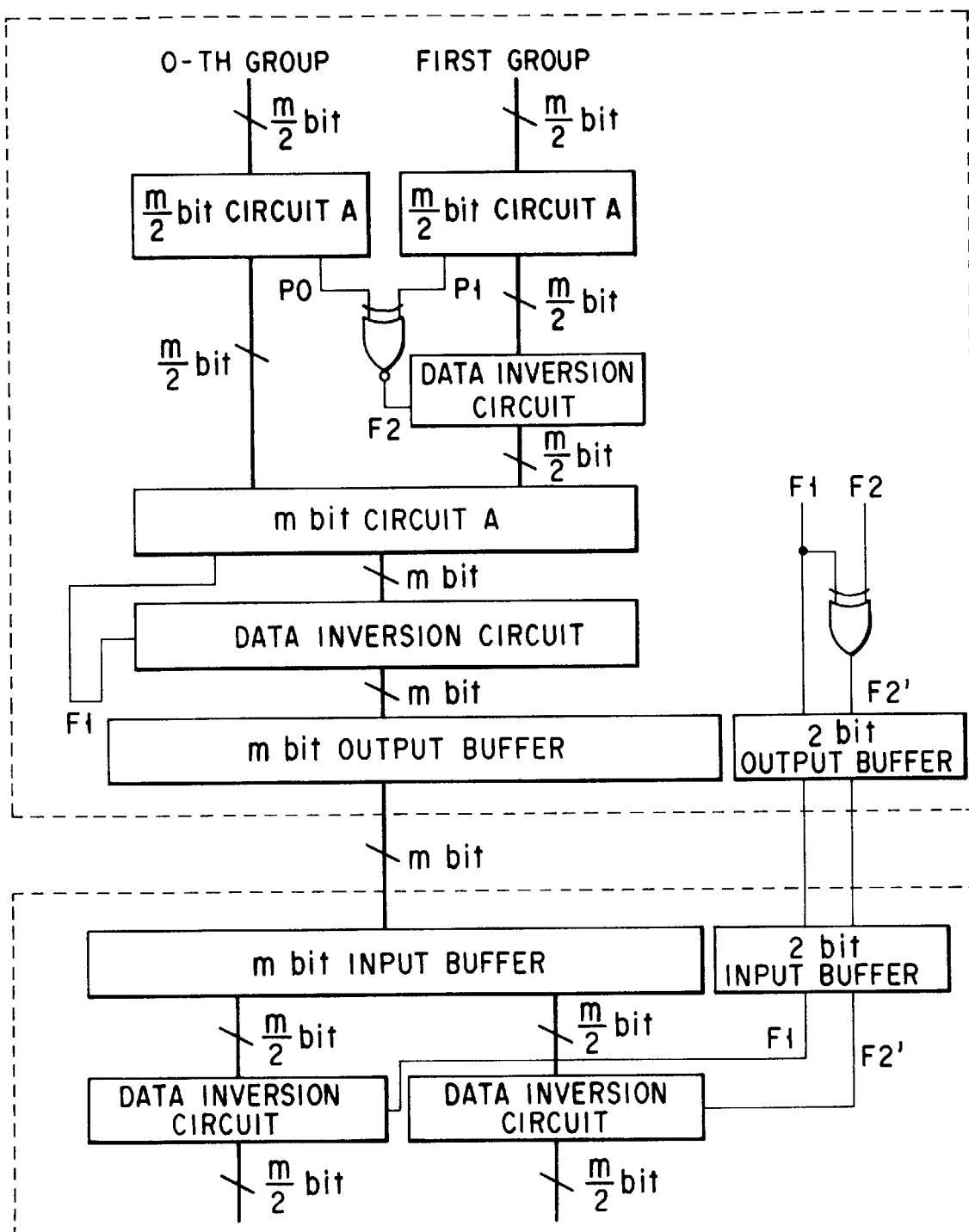
F I G. 23

DEVICE FOR REDUCING THE FLUCTUATION OF POWER SUPPLY VOLTAGE DUE TO INDUCTANCE BY INVERTING BITS IN GROUPS OF DATA LINES

BACKGROUND OF THE INVENTION

The present invention relates to an input/output device which transfers data between semiconductor devices and more particularly to an input/output device which allows a multi-bit input/output operation. More specifically, the present invention relates to an output device which allows a multi-bit output operation, an input device that corresponds to the output device, an input/output apparatus which comprises the output device and the input device, and an input/output operation method.

Today, with the advance of fine processing technology for semiconductor devices, ultra large-scale integration chips containing several millions of transistors, such as high-speed 32- and 64-bit MPUs, and 16- and 64-Mbit DRAMs are being produced. The operating frequency of MPUs has been increased up to 200 MHz. Further, the bus carrying data between an MPU and memory is being increased in width and available in 32, 64, and 128 bits.

With increasing MPU operating frequency, the operating frequency (data rate) of data bus is increased to 60 and 100 Mb/s per pin. The age of 64×100 Mb/s=6.4 Gb/s for the whole bus is also drawing near. In such a state, a large amount of current will flow through the entire output circuit and the oscillation of power lines due to parasitic capacitance associated with the power lines will become very great. For this reason, some measures must be taken to avoid malfunctions.

FIG. 1 shows a conventional input/output circuit of multi-bit (16 bits) configuration. Internal data of 64 bits from an input buffer is taken into an output buffer. The output buffer operates synchronously with the input buffer to output the data onto a 64-bit-wide bus. An input buffer in another chip receives the data over the bus. Since each bit in the output is produced at the same time, the width of the bus becomes large. When the number of bus data lines to be switched at the same time increases, the oscillation of power lines (Vcc, Vss) due to parasitic inductance associated with the power lines becomes serious.

In the case of the output buffer, when its output changed from a high level to a low level, the power supply voltages Vcc and Vss temporarily lowers greatly and then fluctuates in the opposite direction due to the parasitic inductance. This oscillation is repeated with the power supply Vcc being decayed gradually. In particular, when all the I/O lines are switched in the same direction, for example, when all the I/O lines go from a high level to a low level, the oscillation of the power supply voltages becomes maximum. In this case, the oscillation becomes in-phase noise in which Vcc and Vss fluctuate in the same direction. When each bit, except one bit, is the same data, a large oscillation of signal voltage will occur on the bit line corresponding to the data that is opposite to that on the other bit lines.

FIGS. 2A and 2B show examples of conventional output devices in terms of an output buffer circuit for one bit and its associated power supply and output lines. When there are many output lines, I/O lines are usually used which are in common to input lines. In this example, only the output buffer is shown with the input buffer omitted. In many cases each of the output buffers is associated with four I/O lines and one power supply line (Vcc) and one ground line (Vss) and connected from a chip to a printed circuit board external to a package containing the chip through a bonding wire and a lead frame of the package. That is, charging and discharging currents on the four I/O lines flow into the printed circuit board through the two Vcc and Vss lines.

Even with a large number of Vss and Vcc pins placed, however, the power supply lines oscillate greatly due to the parasitic inductance (L1 and L2 in FIG. 2A) associated with the bonding wire and the lead frame. The parasitic inductance per pin is usually in the range of several nanohenries to tens of nanohenries.

The output line is also associated with parasitic capacitance on the bonding wire and the lead frame within the package and the printed circuit board wire. In this case, however, the I/O line oscillation (ringing) or reflections can be suppressed by matching the characteristic impedance ($Zo=\sqrt{L/C}$) to the terminating resistance Rt. However, the ringing component on the I/O line resulting from the parasitic inductance associated with the power supply lines will remain. Compared to the conventional LVTTL compatible interface, the new interfacing technologies, such as terminated LVTTL, CTT, GTL, SSTL, Rambus, etc., is based on a combination of the termination, the impedance matching, and a low-amplitude technique.

However, these technologies will suppress only the influence of the I/O line inductance, but cannot suppress the influence of the power supply inductance. When the power supply line ringing becomes great, the following problems will arise. First, output signals will fluctuate, resulting in failure to make distinction between 0 and 1 in signals on the input side. Second, the power supply fluctuation causes malfunctions in the circuitry within the chip. Third, the chip power supply fluctuation makes it difficult to make distinction between 0 and 1 in signals applied to the chip, failing in correct signal reception.

The way to suppress the power supply fluctuation is to lower the driving capability of the driver at the last stage of the output device or to reduce the peak current by turning the driver ON slowly. If, when the power supply of the output device of FIG. 2A and the power supply of the other portion of the chip are common, the power supply lines fluctuate greatly, the influence of the package inductance will directly be transferred to the internal circuit or the input device, making the first, second and third problems more serious.

One way to solve the second and third problems is to separate the power supply lines (VccQ, VssQ) dedicated to the output device from the other power supply lines (Vcc', Vss') and connect them to the power supply lines (Vcc', Vss') on the printed circuit board through separate pins of the package. In this case, the influence of the parasitic inductance (L1, L2) associated with the bonding wires and the lead frame of the package for the output device can be reduced.

The above way is suitable for the case where the I/O lines are small in number. However, when the number of I/O lines is increased to 32, 64, 128, or 256, the power supply lines (Vcc', Vss') on the printed circuit board (PCB) fluctuate greatly due to the influence of the parasitic inductance on the PCB because a large amount of current flows even if the number of the power supply line pins for the output device is increased. As a result, the power supply lines (Vcc', Vss') for the chip internal circuitry and the input circuit fluctuate through the power supply pins for the other circuitry than the output device. This will result in the second and third problems.

Another conventional approach to solve the above problems is illustrated in FIG. 2B. In this example, two output lines are provided for one bit of data to thereby provide complementary outputs (Dout, /Dout).

In this case, a match occurs between the amount of current flowing from the inside of the chip to the output line and the amount of current flowing from the output line to the inside of the chip. Thus, if a large capacitance (C1 in FIG. 2B) is installed in the chip, most of charge when the output lines are driven is furnished by discharging of the capacitance, resulting in a substantial decrease in current components that flow into and out of the output lines through the parasitic inductances of the power supply lines. Apparently, the current components become zero. In this case, the fluctuation of the power supply lines will contain only a noise component in which Vcc and Vss are 180 degrees out of phase with each other, which is the same as power supply noise when the peak of current dissipation is reached. That is, only a noise component such that, Vcc is lowered, Vss is raised and vice versa is produced. The noise could be further reduced with the use of a larger internal capacitance C1.

Although having an advantage that the power supply noise due to the parasitic inductance associated with the power supply lines can be substantially suppressed, the circuit has a serious disadvantage that the number of output pins, the number of I/O lines, the number of output buffers and the power dissipation are all doubled over the conventional one.

As described above, if, in the conventional output device having a large number of outputs, the output lines are simultaneously driven in the same direction, the peak current increases to make the fluctuation of the power supply lines great. As a result, there arise serious problems that, first, output signals fluctuate to make it impossible to make a distinction between one and zero on the input side, second, malfunctions occur in the chip, and, third, it becomes difficult to decide whether each of signals input to the chip is a 1 or 0.

With the device having a complementary pair of output lines for one bit of data, the noise can be substantially reduced, but the number of output pins, the number of I/O lines, the number of output buffers and the power dissipation are doubled.

BRIEF SUMMARY OF THE INVENTION

It is an object of the present invention to provide an output device which can effect a substantial reduction in peak current flowing through power supply pins and can suppress the fluctuation of power supply voltages due to parasitic inductance associated with the power supply lines even if a plurality of output lines are switched at the same time without significantly increasing the number of I/O lines and the number of output buffers and lowering the output operation speed, an input device associated with the output device, an input/output device having the output device and the input device, and an input/output method.

According to an aspect of the invention there is provided an output device comprising: in-chip data lines of an m-bit (m is an integer of eight or more) configuration for transferring m-bit data containing 1 bits and/or 0 bits; m in-chip output circuits for respectively outputting m bits on the in-chip data lines to m external output pins; decision means, provided for each of n (n is an integer of two or more) groups into which the in-chip data lines and the in-chip output circuits are divided, for deciding whether all bits on each of the n groups of data lines are to be inverted or not on the basis of m-bit data; data inversion circuits provided between the in-chip data lines and the in-chip output circuits in each of at least (n−1) groups and responsive to an output of the decision means for inverting all bits in data on the corresponding in-chip data lines; and inversion information output circuits for outputting to external output pins information indicating whether data in the (n−1) groups have been inverted or not.

According to another aspect of the invention there is provided an input device comprising: m (m=an integer of eight or more) input circuits connected to m external input pins each receiving a corresponding bit of m-bit data, the input circuits being divided into n (n=an integer of two or more) groups; m in-chip data lines for m-bit data inputted by the input circuits, the data lines being divided into n groups; data inversion circuits, interposed between the input circuits in at least (n−1) ones of the n groups and corresponding in-chip output circuits, each for inverting all bits in data transferred over data lines in the corresponding group; and inversion information input circuits each connected to an external input pin to receive information specifying to each of the (n−1) groups whether inversion is to be performed on data in the group.

According to still another aspect of the invention there is provided an input/output device comprising: an input device as claimed in claim 1; and an output device as claimed in claim 2.

In the input/output device, n is 2, 4, 8, or 16, and m is 8, 16, 64, 128, 512, 1024, or 2048 or 9, 18, 36, 72, 144, 288, 576, 1152, or 2304.

In the input/output device, the number of bits of each of the n groups is m/n.

In the input/output device, at least one of m bits of data simultaneously output from the m in-chip output circuits differs from the others.

In the input/output device, m bits of data simultaneously output from the m in-chip output circuits satisfy the condition that (the number of 1 bits)-(the number of 0 bits)$\leq$m/n.

In the input/output device, the decision means includes a decision circuit for deciding which of 1 bits and 0 bits in data in the corresponding group are larger in number; and an inversion circuit for inverting all bits in data for one of groups when 1 bits or 0 bits are predominant over 0 bits or 1 bits in each of the groups In the system comprising input/output devices as described above, there is further provided at least one of an MPU, a memory controller, a system bus, and a circuit board.

In the input/output device, m bits of data simultaneously output from the m in-chip output circuits satisfy the condition that 0$\leq$(the number of 1 bits)-(the number of 0 bits) $\leq$m/n.

In the input/output device, m bits of data simultaneously output from the m in-chip output circuits satisfy the condition that −m/2$\leq$(the number of 1 bits)−(the number of 0 bits)$\leq$0.

In the input/output device, when the m in-chip output circuits output sets of m bits of data successively, two successive sets of m bits of data output from the m in-chip output circuits satisfy the condition that |(the number of bits each of which has made a transition from a 0 to a 1)−(the number of bits each of which has made a transition from a 1 to a 0)|$\leq$m/2n.

In the input/output device, the decision means includes a first decision circuit for deciding which of 1s and 0s in each group of data are larger in number; a first inversion circuit for inverting all bits in data for one of groups when 1 bits or 0 bits are larger in number than 0 bits or 1 bits in each of the groups; a second decision circuit for deciding which of 1s and 0s in m bits of data of output of the first inversion circuit are larger in number; and a second inversion circuit for inverting all bits in the m bits of data when it is decided by the second decision circuit that 1 bits are larger in number than 0s.

In the input/output device, the decision means includes a first decision circuit for deciding which of 1s and 0s in each group of data are larger in number a first inversion circuit for inverting all bits in data for one of groups when 1 bits or 0 bits are larger in number than 0 bits or 1 bits in each of the groups; a second decision circuit for deciding which of 1s and 0s in m bits of data of output of the first inversion circuit are larger in number; and a second inversion circuit for inverting all bits in the m bits of data when it is decided by the second decision circuit that 0 bits are larger in number than 1s.

In the input/output device, the decision means includes means for deciding whether data is to be inverted or not by means of a parallel combination of first transistors having their gates connected to receive positive-logic data and a parallel combination of second transistors having their gates connected to receive negative-logic data.

In the input/output device, the decision means decides whether data is to be inverted or not on the basis of the result of amplification of a potential difference produced at drain electrodes of the first and second transistors by a difference between driving currents of the first and second transistors.

In the input/output device, the decision means includes a series combination of parallel-connected pMOS transistors and parallel-connected nMOS transistors having their gates connected to receive positive-logic data and a series combination of parallel-connected nMOS transistors and parallel-connected pMOS transistors having their gates connected to receive negative-logic data.

In the input/output device, the decision means decides whether data is to be inverted or not on the basis of the result of amplification of a difference in potentials produced at intermediate nodes of the series combinations of the parallel-connected MOS transistors.

In the input/output device, a resistor is connected in series with each of the MOS transistors.

According to a further aspect of the invention there is provided a data input/output method comprising: dividing m-bit data into n groups (m=an integer of eight or more and n=an integer of two or more); deciding whether data in each of at least (n−1) ones of the n groups is to be inverted or not; inverting data in the (n−1) groups on the basis of the result of the decision step; and outputting information as to whether the data in the (n−1) groups has been inverted or not.

The input/output method further comprises deciding whether m-bit data subjected to inversion is to be inverted or not; and inverting the m-bit data when it is decided that it is to be inverted.

Heretofore, if 0 bits or 1 bits are simultaneously output on all the output lines of m output buffers, a current peak is caused at power supply pins of the output buffers, producing a large amount of power supply noise due to the parasitic inductance associated with the power supply pins. In contrast, the present invention prevents the same bit of data from appearing 0 bits.

Thus, the in-phase noise of Vcc and Vss for those bits will remain. However, the noise is reduced to 1/n of that in the conventional method. The larger the value of n, the more the noise reducing effect is increased.

When an internal data inversion function is installed, at least (n−1) pins are required for n groups to inform the input device of whether data has been inverted or not. One group of data is not required to be inverted. By using this group as the criterion for inverting other groups, the number of groups of data to be inverted is decreased from n to n−1. A total of (m+n−1) output circuits and output pins are required. Therefore, the numbers of the pins and the output circuits and power dissipation can be reduced significantly as compared with the conventional method in which the output lines are used in pairs, each pair of output lines is operated in a complementary manner, and hence 2m output lines are needed for m-bit data.

Assume that the number of I/O lines is m=128 and the number of groups is n=4. In the present invention, therefore, the number of output circuits is m+n+1=131 and power supply noise can be reduced to about 1/4 although power dissipation is slightly increased by 131/128 relative to the conventional method using 128 I/O lines. In contrast, the conventional the output pins at the same time. The reason is as follows. The m internal data lines and output circuits are divided into n groups and decision means is provided which decides whether all bits in each of group of data are to be inverted or not. If, even when 1 bits are larger in number than 0 bits in some group of data and moreover 1 bits are larger than 0 bits in some other group of data as well, all bits in the second-mentioned group of data are inverted, then 0 bits will predominate over 1 bits. The 0 bits in the second-mentioned group will cancel out the 1 bits in the first-mentioned group of data.

For this reason, a relationship of (the number of 1 bits)−(the number of 0 bits)≦m/n holds for m-bit data on the m output lines. Even in the worst case, (m−m/n) bits of data have equal numbers of 1s and 0s. Thus, in principle the in-phase noise of Vcc and Vdd for those bits is eliminated and only the opposite-phase noise results. By having a large capacitance between internal power supply lines Vcc and Vss, charging and discharging currents to the output lines can be supplemented by that capacitance. Thus, charging and discharging currents from the power supply pins can be reduced significantly, eliminating power supply noise due to parasitic inductance associated with the power supply lines.

The remaining m/n bits of data may be all 1 bits or system using output lines in pairs requires 256 I/O lines and dissipates twice as much power. Thus, the advantages of the present invention are obvious at a glance.

If the power supply noise remained unchanged from the conventional method, then more I/O lines could be implemented with one chip to thereby significantly increase the band width of the entire bus. In addition, the drivability and switching speed of output transistors in the output circuits can be increased all the more for a reduction in power supply noise to increase the data rate for one pin and the bandwidth of the entire bus.

Moreover, the present invention can be provided with a function of deciding which of 1s and 0s are larger in number in the entire data subjected to partial inversion and inverting the entire data if 0 bits or 1 bits are predominant so that 1 bits or 0 bits will always predominate. Then, a relationship of 0≦(the number of 1s−the number of 0 bits)≦m/n or −m/n≦ (the number of 1s−the number of 0 bits)≦0 holds all the time. As a consequence, when a number m of output circuits successively output sets of m bits of data, in two successive data sets a relationship is established such that |(the number of bits that has made a transition from 0 to 1–the number of bits that has made a transition from 1 to 0)≦m/2. In this case, when m-bit data is divided into n groups, switching noise can be reduced to 1/2n with the use of only n pins for informing whether data has been inverted.

As described above, according to the present invention, there is provided an input/output device which, by dividing internal data lines and n internal output circuits into n groups and deciding whether all the bits in each group of data are to be inverted or not on the basis of m-bit data, can effect a substantial reduction in peak current flowing through power supply pins and can suppress the fluctuation of power supply voltages due to parasitic inductance associated with the power supply lines 1/n or 1/2n even if a plurality of I/O lines are switched at the same time without significantly increasing the numbers of I/O lines and output buffers and lowering the output operation speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A, 4B and 4C show an example of the comparator according to a second embodiment;

FIG. 5 shows an implementation of the comparator of FIG. 3 in analog form according to a third embodiment;

FIG. 6 shows an arrangement of the amplifier of FIG. 5 according to a fourth embodiment;

FIGS. 7A and 7B show an arrangement of a control circuit and the operation timing in the third embodiment;

FIG. 8 shows another arrangement of the comparator of FIG. 5 according to a fifth embodiment;

FIGS. 12A, 12B and 12C show an example of a data inversion circuit according to an eighth embodiment;

FIGS. 16A and 16B show an example of data connection between chips according to a twelfth embodiment;

FIG. 22 shows an input/output device according to a fourteenth embodiment;

FIG. 23 shows an input/output device according to a fifteenth embodiment;

DETAILED DESCRIPTION OF THE INVENTION

First Embodiment

Figure 1:
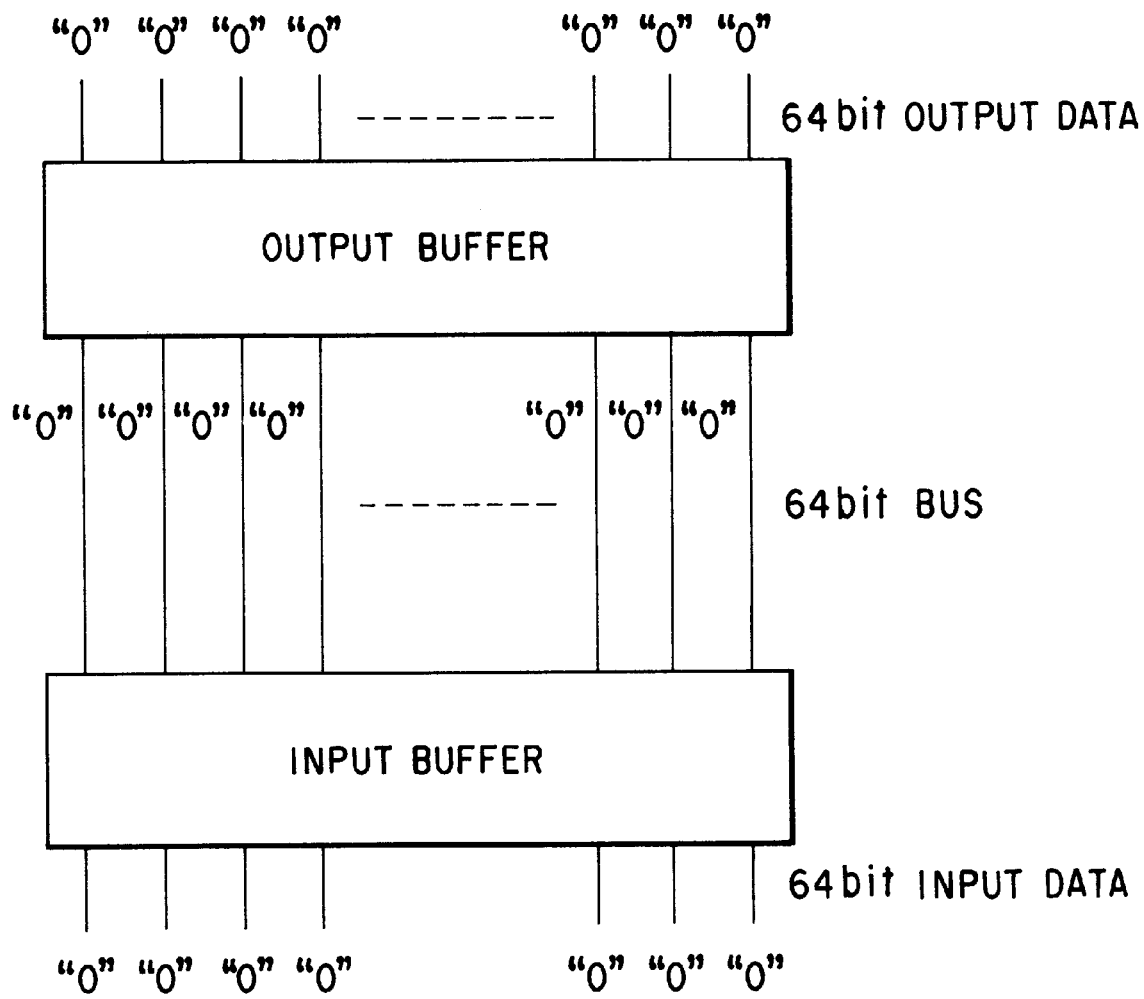
FIG. 1 shows a conventional input/output device.
Figure 2A:
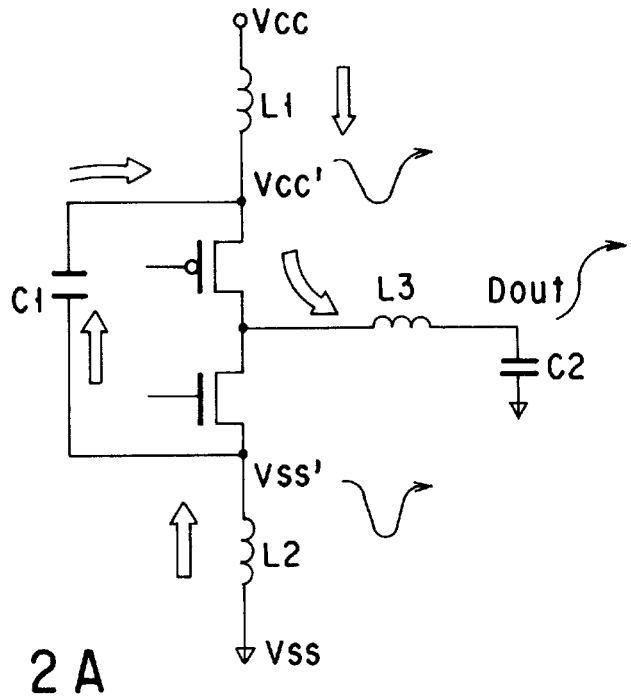
FIGS. 2A and 2B show arrangements of conventional output devices.
Figure 2B:
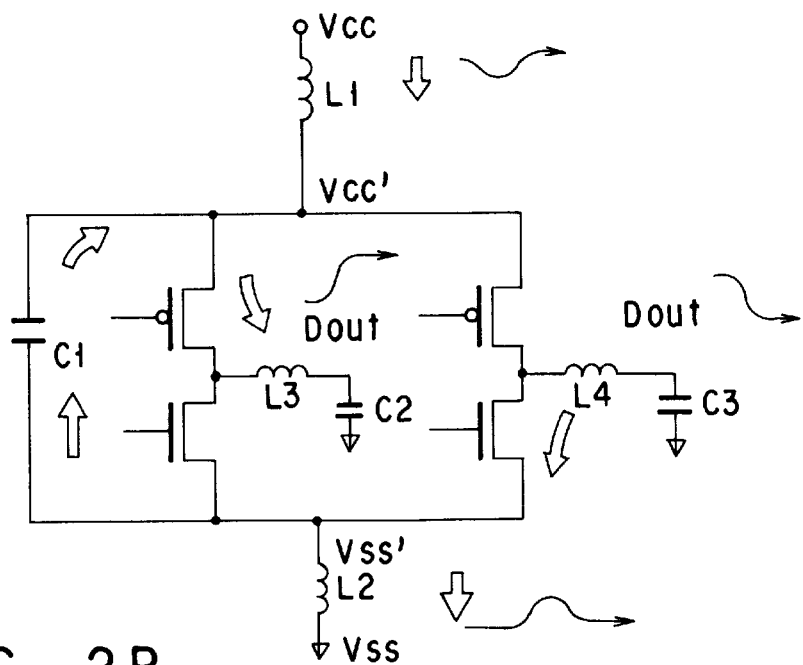
Figure 3:
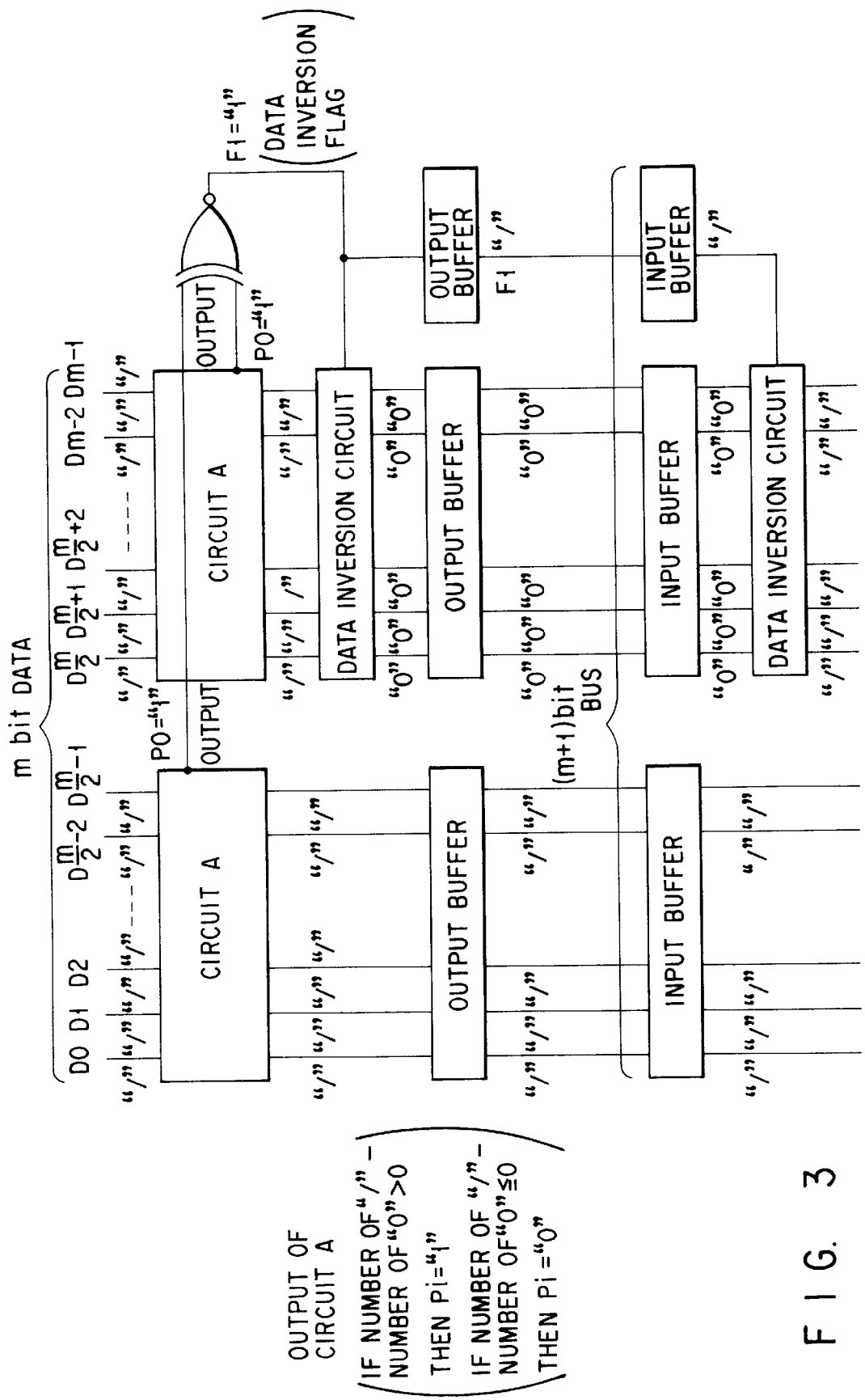
FIG. 3 is a block diagram of an input/output device according to a first embodiment of the invention.

FIG. 3 shows an input/output device according to a first embodiment of the present invention. The device has data output and input devices of m bits wide and an m-bit data bus.

In this arrangement, m-bit data D0 to Dm–1 inside a chip are divided into a first group of bits of data D0 to Dm/2–1 and a second group of bits of data Dm/2 to Dm–1 each of which is applied to a respective one of two circuits A having outputs P0 and P1. Each of the circuits A produces at its output Pi a 1 when, in the m/2-bit input data, the number of 0s is less than the number of 1s or a 0 when the number of 1s is equal to or less than the number of 0s.

Each of the circuits A is considered to be a comparator that makes a comparison between the number of 1s and the number of 0s. For example, as shown in FIG. 3, when all the bits of internal data are 1s, the outputs P0 and P1 will be P0=1 and P1=1 because the number of 0s is less than the number of 1s. When P0=1 and P1=1 or when P0=0 and P1=0, that is, when each of the first and second groups of bits of data contains more 1s than 0s or when each of the first and second group contains more 0s than 1s, that is, when an output flag F1 when P0 and P1 are EXCLUSIVE NORed (XNOR) takes one, the difference between the number of 1s and the number of 0s in data on the m-bit bus will be decreased by outputting the bits of data in the first group as they are and outputting the bits of data in the second group inverted.

With the conventional method in which the bits of internal data are output unchanged, it is when all the bits are 1s or 0s that the in-phase noise of the power supply noise becomes worst. In the present embodiment, when all the bits are 1s as shown in FIG. 3, all the bits in the first group are output through the output buffer onto the output bus as they are, while all the bits in the second group are inverted by the data inversion circuit to 0s and then output through the output buffer onto the output bus as 0s since the flag F1 is set to one. The data inversion circuit is controlled by the control input F in such a way that its input data is output inverted when F1=1 and it is output unchanged when F1=0.

As a consequence, in the present embodiment, the output of the output buffer when all bits of internal data are 1s, the worst case in the conventional device, contains equal numbers of 1s and 0s, so that current flowing output of the chip and current flowing into the chip are made equal to each other. Thus, if a capacitor having large capacitance C1 is connected between Vcc and Vss in the chip, then the output operation will apparently amount to discharging of that capacitor. For this reason, power supply noise (in-phase noise) due to the parasitic inductance associated with the power supply lines (on the package, PCB), which is caused when a peak current is supplied from external power supply through power supply pins, is eliminated, thereby solving the conventional problems of the fluctuation in the output buffer, malfunctions of the internal circuitry, malfunctions of the input buffer due to fluctuation of the power supply, and poor input response.

However, only the power supply noise (in-phase noise) due to the parasitic inductance of the power supply lines which is caused by charging and discharging in the internal circuitry of the chip will remain. This noise will be easily reduced by providing a large capacitance C1 across the power supply. Consequently, according to the present invention, the power supply noise can be significantly reduced.

In order to allow the input side to restore data that was inverted on the output device side, the inversion flag F1 is sent from an output buffer to an input buffer at the other end over a bus. When F1=1, the bits in the first group input to the input buffer are inverted and then taken in as internal data. When F1=0, on the other hand, the bits are taken in as internal data as they are. Naturally, the first data that is output non-inverted is taken in as it is on the input side as well.

In the case where the bits of internal data are all 1s as in FIG. 3, the bits of the second group are output as 0s on the bus lines. In this case, since F1=1, the inverted bits of the second group are again inverted by a data inversion circuit, so that the bits are restored to their original values, or 1s. The worst case of the present embodiment corresponds to the case where the bits in the first group are all 1s, and half of the bits in the second group are 1s and the remaining half are 0s. In this case, P0=1 and P1=0, so that the bits in the second group are output non-inverted. The second group of data contains equal numbers of 1s and 0s, which helps cancel in-phase noise. However, the first group of data in which bits are all is contributes to in-phase noise.

Considering a pin for the flag, the number of bus lines that cause in-phase noise is m/2−1 when F1=0, which is a little less than half of the conventional number of bus lines. That is, the conventional problems of fluctuation in the output buffer, malfunctions of the internal circuitry, malfunctions of the input buffer and poor input response due to fluctuation of the power supply, which are all caused by in-phase noise, can be solved. The reason why Pi=0 on the condition that input data has equal numbers of 1s and 0s is to reduce in-phase noise as much as possible. If Pi were not 0 under such condition, the number of bus lines contributing to in-phase noise would slightly increase to m/2+1, inclusive of the flag pin.

According to the present embodiment, the power supply noise of the output circuit can be halved by simply increasing the number of output pins by only one as opposed to doubling the number of output pins as in the conventional one-bit, two-I/O-line device. In addition, an increase in the power dissipation is slight, the ratio of power dissipation in the present embodiment to the power dissipation in the conventional device being (m+1)/m. The present embodiment may be modified such that the first data is inverted when the number of 1s is more than the number of 0s and the second data is inverted when the number of 1s is more than the number of 0s. In this case, two flag pins are needed.

The present embodiment may be used to reduce power supply noise, increase the number of output I/O lines according to a reduction in noise, improve the drivability of the output buffer, or improve the band width of the entire bus according to an improvement in switching speed. In FIG. 3, the circuits A may be arranged to simply allow input data Di to pass through or latch the input data once and then output it.

In the present embodiment in which m-bit data is divided into two groups, the following relationship holds:

|(the number of 1s)−(the number of 0s)|≦m/2

In the conventional device, on the other hand, the following relationship holds:

|(the number of 1s)−(the number of 0s)|≦m

According to the invention, therefore, the in-phase noise can be reduced to one half.

Strictly speaking, the switching noise is determined by a previous output signal Qn−1 and a current signal Qn and occurs when an output bit is changed from 1 to 0 or from 0 to 1. No noise occurs when an output bit remains unchanged. Thus, the noise can be defined only by (the number of bits that made a transition from 0 to 1)−(the number of bits that made a transition from 1 to 0).

However, the above expression holds for both current output signals and previous output signals. Thus,

|(the current number of 1s)−(the current number of 0s)|≦m/2

|(the previous number of 0s)−(the previous number of 1s)|≦m/2

From the two expressions, the following relationship holds:

|(the current number of 1s)−(the current number of 0s)+(the previous number of 0s) −(the previous number of 1s)|≦m As an example, (the current number of 1s) can be resolved into (the number of 1-to-1 bits)+(the number of 0-to-1 bits). Thus,

|(the number of 1-to-1 bits+the number of 0-to-1 bits) −(the number of 1-to-0 bits+the number of 0-to-0 bits)

+(the number of 0-to-0 bits+the number of 0-to-1 bits) −(the number of 1-to-1 bits+the number of 1-to-0 bits)|=2 (the number of 0-to-1 bits−(the number of 1-to-0 bits)≦m Dividing by two yields

|(the number of 0-to-1 bits)−(the number of 1-to-0 bits)|≦m/2

Thus, noise can be reduced to half.

Second Embodiment

FIGS. 4A to 4C show a second embodiment of the present invention, which is directed to a comparator that makes a comparison between the number of 1s and the number of 0s. FIG. 4A is a truth table of Pi for 4-bit data. If the number of 1s is more than the number of 0s, then Pi=1; otherwise, Pi=0. FIG. 4B shows an implementation of the comparator using general logic circuits. FIG. 4C shows an implementation of the comparator using a pass transistor network, which can significantly reduce the number of devices as compared with the implementation using general logic circuits.

Third Embodiment

The comparator of the second embodiment can be adapted to accommodate more bits such as 16, 32, 64, or 128 bits. However, problems arise in that a large number of devices are required and the time required to make comparison increases.

FIG. 5 shows an analog version of the comparator. Two sets of k parallel-connected transistors of equal size are provided for k-bit input data. Input data of positive logic is connected to the gates of transistors in the first set, while input data of negative logic is input to the gates of transistors in the second set. The common drain nodes of the respective transistor sets are connected to an amplifier which amplifies the difference between potentials V1 and V0 on the common drains of the respective transistor sets. The amplifier provides complementary outputs Pi and /Pi.

For example, when, in input data, the number of 1s is more than the number of 0s, the number of transistors that are turned ON on the V1 side is larger than those on the V0 side. As a result, V1 becomes lower than V0. This will produce a 1 at the output Pi.

The present comparator is arranged such that Pi=0 results when 1s and 0s are equal in number to each other. To this end, an additional transistor is connected to the V0 node, which has its gate connected to a DVALID signal which is high during operation. Thus, V0 is made slightly lower than V1 when 1s and 0s are equal in number to each other, thereby providing Pi=0. The size of the additional transistor is made equal to or somewhat smaller than that of the other transistors. The reason why the additional transistor is made smaller is that a malfunction resulting from Pi=1 when the number of 1s−the number of 0s=0 has smaller effect than a malfunction resulting from Pi=0 when the number of 1s−the number of 0s=2 (this value is always even as long as an even number of bits are input).

The comparator of the present embodiment has the possibility of malfunction because of analog type. For example, the malfunction is likely to occur when input data has many bits, such as 54 bits, and moreover the difference between the numbers of 1s and 0s is small. When the difference between the number of 1s and the number of 0s is small, little change occurs in the amount of power supply noise at the output irrespective of the presence or absence of data inversion. For example, suppose that, for 64-bit input data, the first data group of FIG. 3 has 32 bits of one and the second data group has 17 bits of one and 15 bits of zero and P1=0 results because of malfunction. Then, on the output bus, the number of 1s−the number of 0s32=+2+1=35, which is larger than 31 in the case where no malfunction occurs. However, a sufficient effect can be expected as compared with the conventional device.

On the other hand, when the second data group has 16 bits of one and 16 bits of zero and P1=1 results because of malfunction, the number of 1s−the number of 0s on the output bus becomes 32+1=33, which is advantageous over the case where no malfunction occurs. Thus, the size W' of the DVALID input transistor should preferably be made larger than that of the other transistors. In digital circuits, no malfunction is allowed. In the present embodiment, however, there is only some reduction in effect even if a malfunction occurs. In the present invention, therefore, such an analog circuit as shown in FIG. 5 can be used. Thus, a fast comparator adaptable to the invention can be implemented with a small number of devices.

Fourth Embodiment

FIG. 6 shows a fourth embodiment of the present invention which is directed to a specific arrangement of the amplifier of FIG. 5. nMOS transistors alone, which are connected to V1 and V0, cannot prevent the potentials on the V1 and V0 nodes from falling to Vss. For this reason, two pMOS pull-up transistors each having an equivalent resistance of R are connected to V1 and V0 as shown. The amplifier is of a CMOS latch type, but it may be of a current mirror type. The outputs of the amplifier are connected to inverters to provide outputs Pi and /Pi. Di and /Di are kept low during non-operating time to eliminate feed-through current; during the operating time, either of them is made high. After all the internal data Di are determined, a determination signal DVALID is used to operate the comparator.

FIG. 7A shows a specific circuit arrangement associated with data signals Di and /Di and the determination signal DVALID. FIG. 7B is a timing diagram of the comparator.

Fifth Embodiment

FIG. 8 shows a fifth embodiment of the present invention in which not only nMOS transistors but also pMOS transistors are connected to the V1 and V0 nodes. With such an arrangement, the difference between V1 and V0 becomes easy to widen in comparison with the circuit of FIG. 6 and malfunctions can be reduced when input data contains many bits and 1s and 0s are small in number. The reason is stated briefly. In FIG. 6, V0 and V1 are only pulled down by the nMOS transistors and hence |V1−V0 |depends only on the difference in the number of nMOS transistors that are turned ON. In FIG. 8, on the other hand, the pMOS transistors act to pull up V0 and V1 while they are pulled down by the nMOS transistors; thus, |V1−V0 |depends also on the difference in the number of pMOS transistors that are driven ON and hence widens about twice as much as the difference in FIG. 6.

Figure 9A:
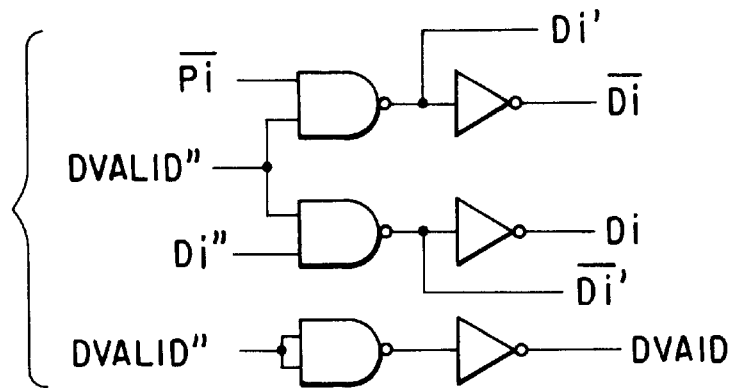
FIGS. 9A, 9B and 9C show an arrangement of the control circuit, operation timing and an arrangement of the latch circuit in the fifth embodiment.
Figure 9B:
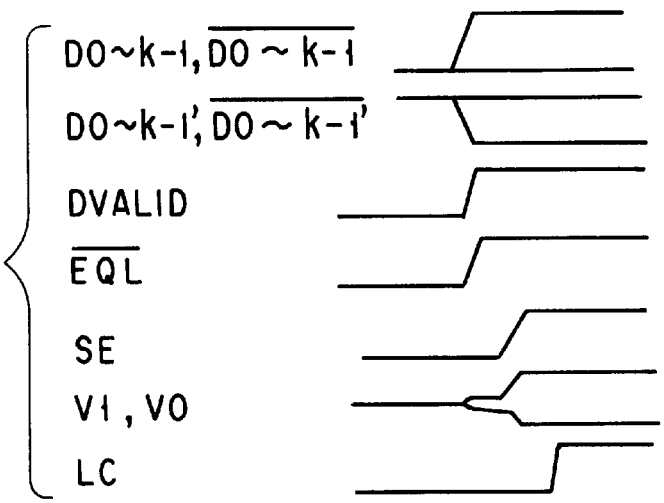
Figure 9C:
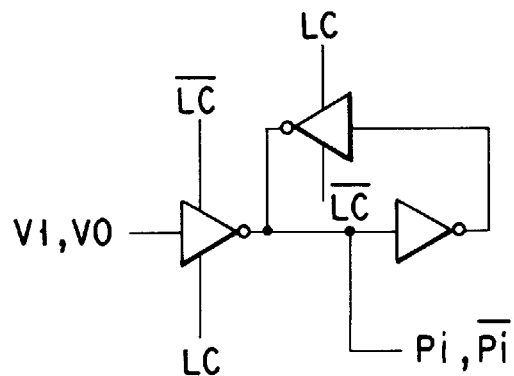

In the present embodiment, the precharged voltage of the V1 and V0 nodes at non-operating time can be controlled freely by a VDC potential. In other cases than the case where VDC is VCC (or internal Vcc) or Vss, to prevent feed-through current at non-operating time, the gate voltage of the pMOS transistors connected in parallel is required to be kept at Vcc (or internal Vcc). This requirement can be met by a control circuit of FIG. 9A as opposed to the circuit of FIG. 7A. FIG. 9B is a timing diagram of the comparator of FIG. 8, and FIG. 9C shows a latch circuit that latches the V1 or V0 output. Thus, even if, at the non-operating time, V1 and V0 are potentials between Vcc and Vss, the feed-through current on the latch side can be prevented.

The above-described malfunctions are not only due to variations in threshold voltage among the transistors in the amplifier but also due to variations in drivability among the parallel transistors. The variations in threshold voltage among the amplifier transistors can be compensated for by the use of a compensation type of amplifier. The variations in drivability among the parallel transistors can be reduced by inserting a resistor between each transistor and the corresponding node to increase its drivability and controlling a current with the resistor.

Sixth Embodiment

Figure 10:
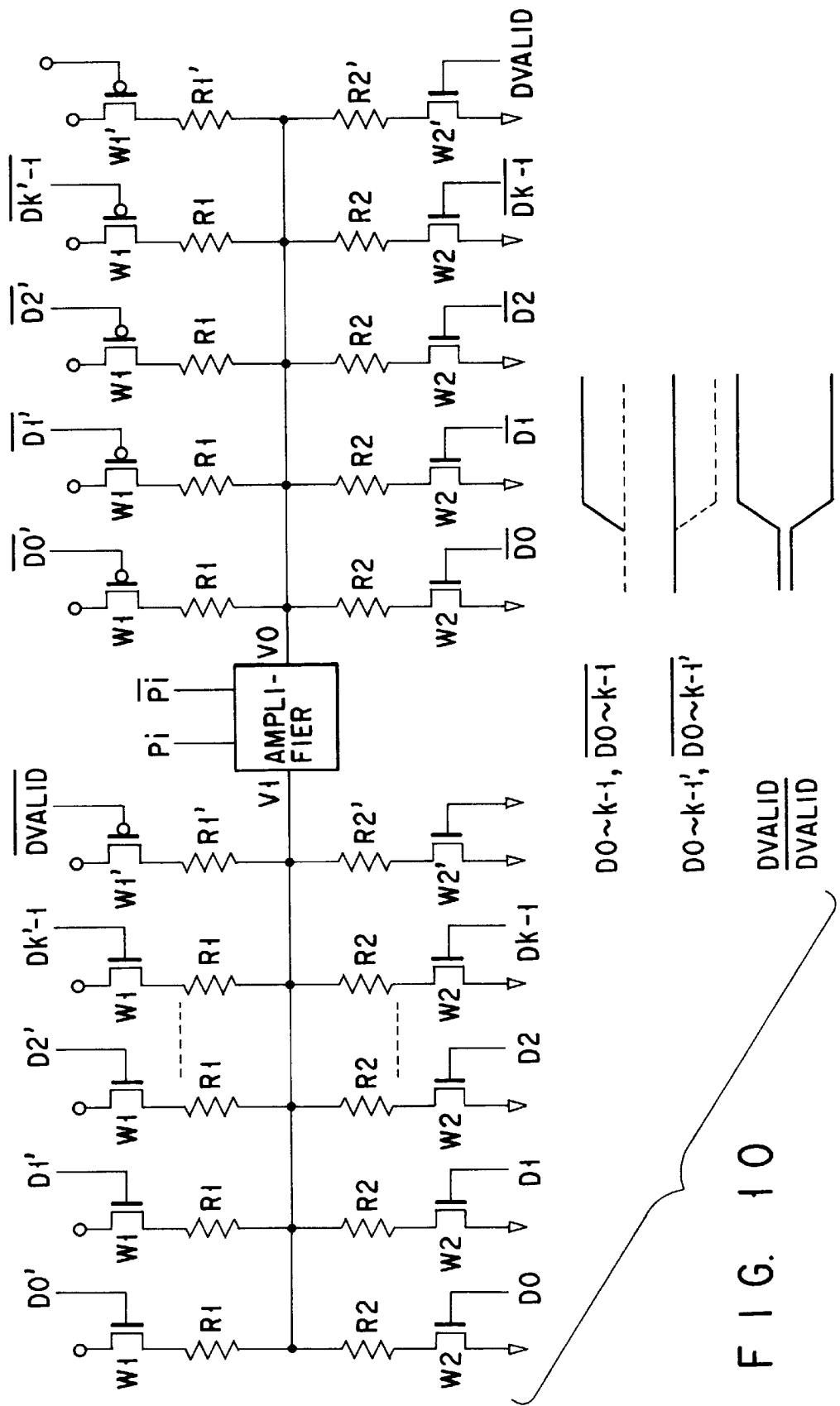
FIG. 10 shows an arrangement of a comparator according to a sixth embodiment.

FIG. 10 shows a sixth embodiment of the present invention. In this embodiment, a resistor is interposed between each transistor and the corresponding one of the V1 and V0 nodes in the arrangement of FIG. 8. Note that the resistor and the transistor are allowed to exchange their places with each other. If each of the resistors is formed of a diffusion layer or polysilicon layer, then variations in resistance can be reduced.

Seventh Embodiment

Figure 11:
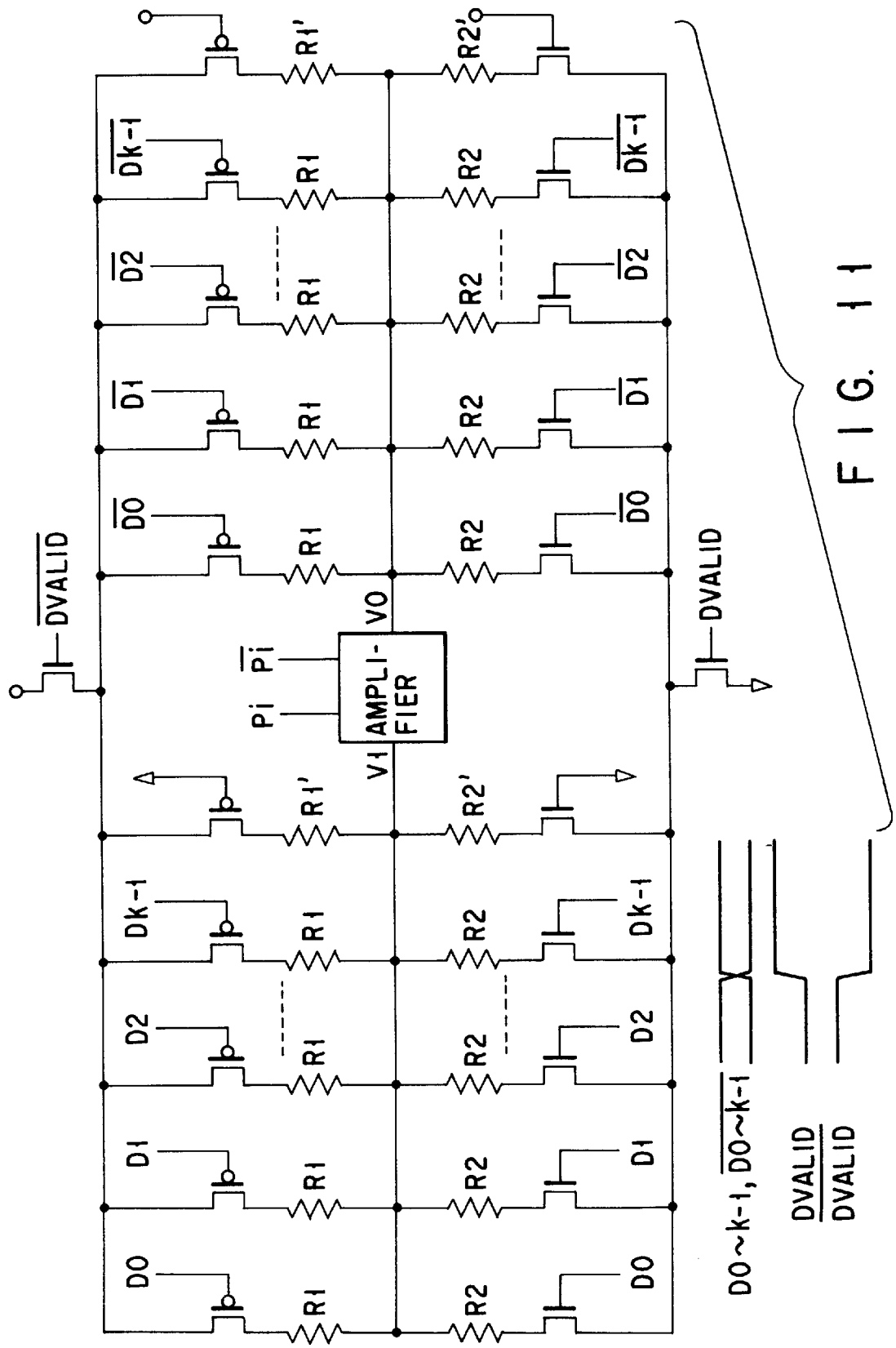
FIG. 11 shows an arrangement of a comparator according to a seventh embodiment.

FIG. 11 shows a seventh embodiment of the present invention, which is arranged to prevent feed-through current during non-operating time. This embodiment remains basically unchanged from the arrangement of FIG. 10, but it is distinct in that a first switching device is connected to the parallel-connected sources of the nMOS transistors and a second switching device is connected to the parallel-connected sources of the pMOS transistors. The feed-through current can be eliminated by turning these switching devices OFF during non-operating time.

Eighth Embodiment

FIGS. 12A to 12C show an eighth embodiment of the present invention which is directed to the data inversion circuit of FIG. 3. More specifically, these figures show the data inversion circuit for one bit of data. The data inversion circuit may be formed of pass transistors as shown in FIG. 12A or an EXCLUSIVE OR circuit as shown in FIG. 12B. In the arrangement of FIG. 12C, a complementary pair of internal data, Dj and /Dj, is used.

Ninth Embodiment

Figure 13:
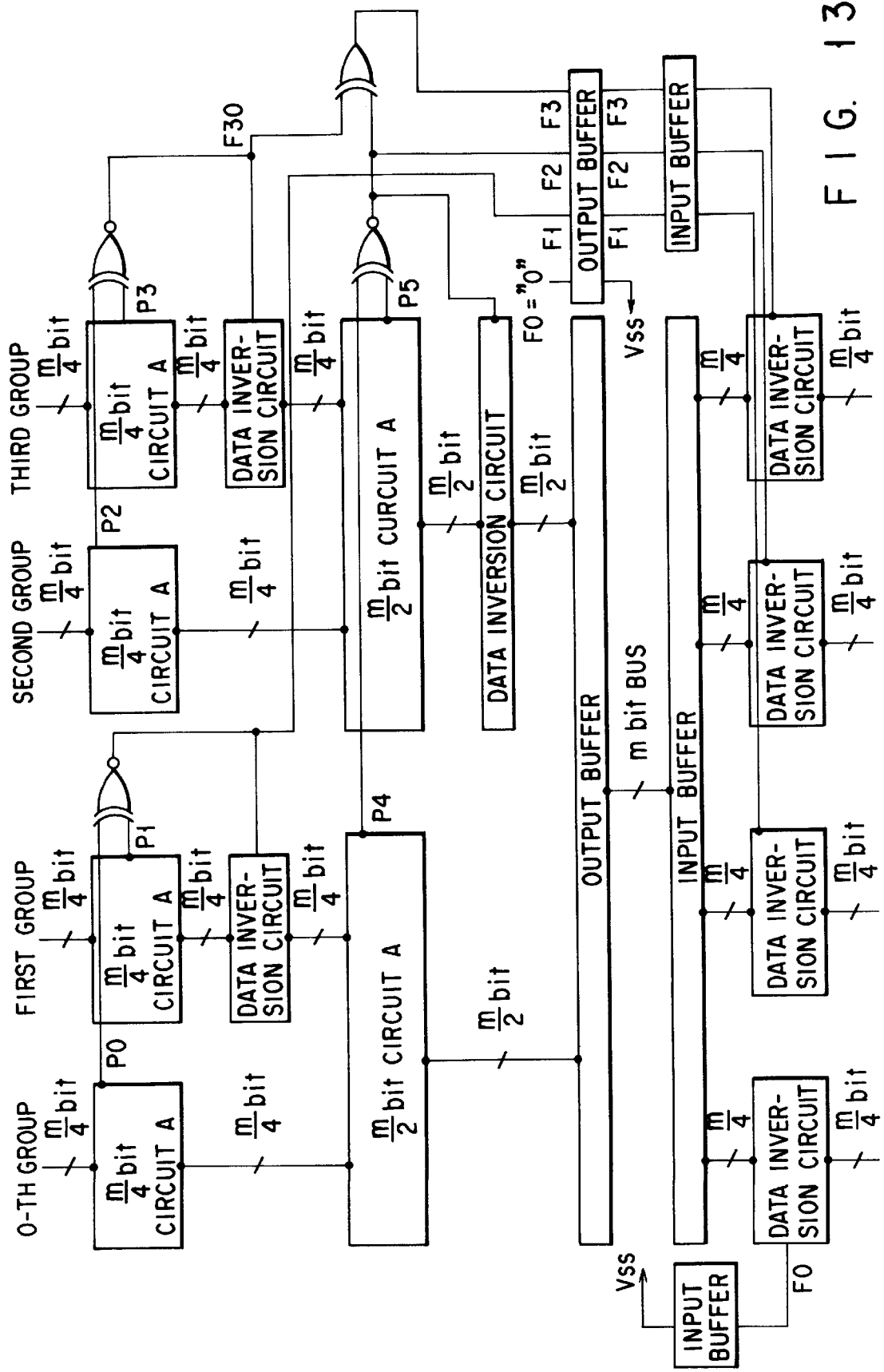
FIG. 13 shows an input/output device according to a ninth embodiment.

FIG. 13 shows a ninth embodiment of the present invention. In this embodiment, m-bit internal data is divided into four groups of data, the 0-th to the third group. The same data comparison and data inversion as in the first embodiment of FIG. 3 are performed between the 0-th and the first group of data. That is, m/4-bit data in each of the 0-th and first groups is applied to the corresponding comparator A, which provides at its output P0 or P1 an output indicating whether or not the number of 1 bits is more than the number of 0 bits. If, in this case, the output F1 of the XNOR (P0, P1) is a 1, then the first group of data is inverted by the data inversion circuit.

At the same time the operation is performed on the 0-th and the first group of data, the same data comparison and data inversion as in the first embodiment are performed on the second and third groups of data as well. That is, m/4-bit data in each of the second and third groups is applied to the corresponding comparator A, which provides at its output P2 or P3 an output indicating whether or not the number of 1 bits is more than the number of 0 bits. If, in this case, the output F30 of the XNOR (P2, P3) is a 1, then the third group of data is inverted by the data inversion circuit.

After that, the 0-th and first group of data are grouped together into a fourth group of m/2 bits of data and the second and third groups of data are grouped together into a fifth group of m/2 bits of data. The data comparison and data inversion are performed on the fourth and fifth groups of data. That is, m/2-bit data in each of the fourth and fifth groups is applied to the corresponding comparator A, which provides at its output P4 or P5 an output indicating whether or not the number of 1 bits is more than the number of 0 bits. If, in this case, the output F2 of the XNOR (P4, P5) is a 1, then the fifth group of data is inverted by the data inversion circuit.

In this arrangement, the third group of data is subjected to inversion only when either of the flags F30 and F2 is inverted. Thus, the ultimate flag F3 for the third group becomes F3=XOR(F30, F2) as shown.

In the present embodiment, the in-phase noise becomes maximum on the bus, in other words, the numbers of 1 bits and 0 bits become maximum when the 0-th group contains only 1 bits and the first to third groups each contain equal numbers of 1 bits and 0 bits. At this point, F1=0, F2=0, and F3=1. Considering the flag values, the difference between the number of 1 bits and the number of 0 bits on the bus will be m/4−1. This value is less than 1/4 of m, m being the value in the worst case of the conventional device. Thus, the present embodiment can reduce the power supply noise due to the parasitic inductance of the power supply lines more than the first embodiment can. Moreover, the number of bus lines and the power dissipation are only increased by a value corresponding to three pins. With m=128 bits, this value corresponds to 2.3%.

The input device receives the m-bit bus data and the three inversion flags F1 to F3. When F1 to F3 are each a 1, the first to third data are inverted for restoration to correct internal data. The input device of the present embodiment is provided with a data inversion circuit for the 0-th group of data that is not supposed to be inverted, a pin receiving inversion information, and an input buffer. In addition, the output buffer for flags purposely outputs an F0 flag of 0 for the 0-th data group, which is dropped to a Vss pin. Alternatively, 4-bit flag arrangement may be used. The utility of this circuit will be described later with reference to FIGS. 17A to 19.

Tenth Embodiment

Figure 14:
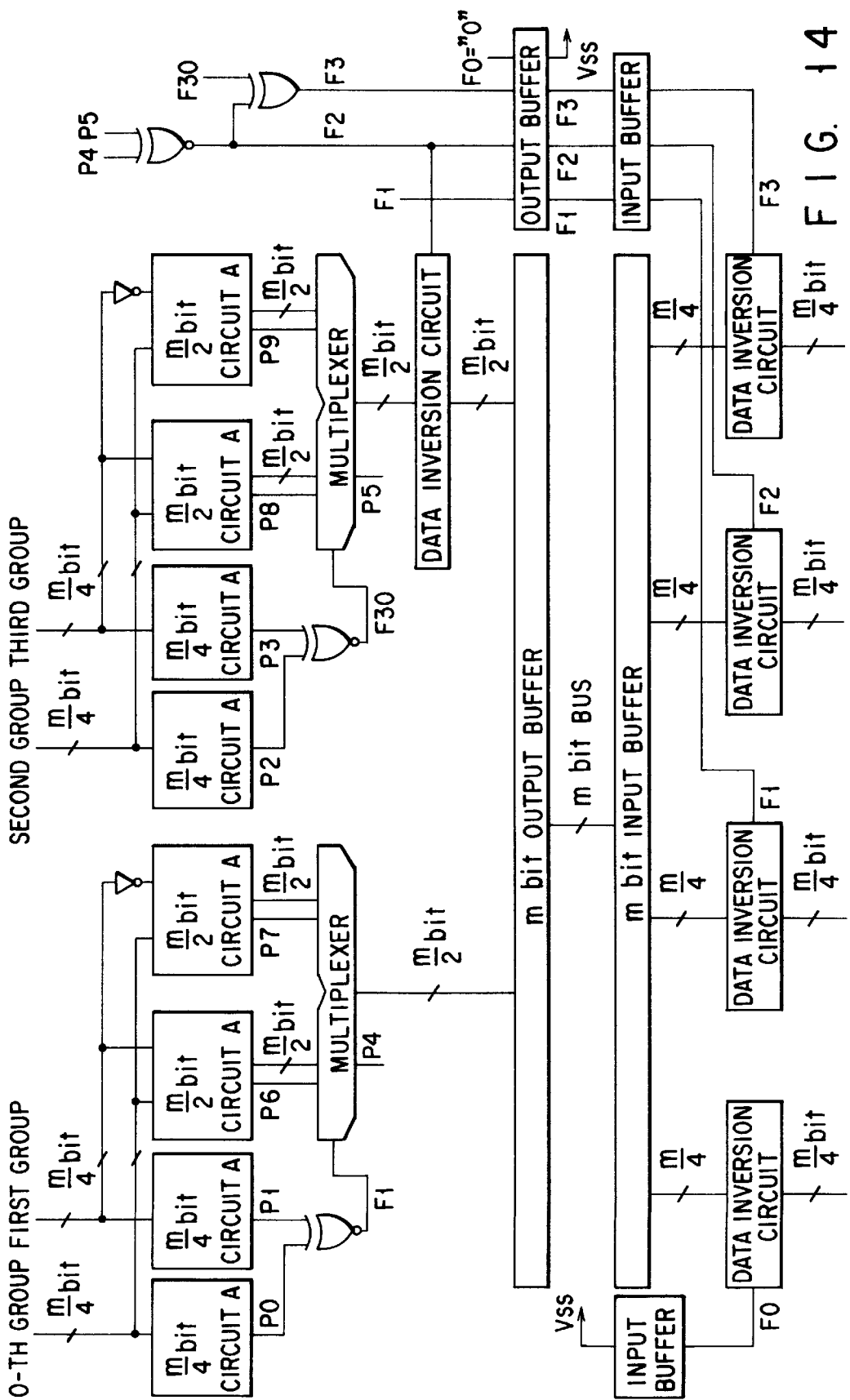
FIG. 14 shows an input/output device according to a tenth embodiment.

FIG. 14 shows a tenth embodiment of the present invention. In the ninth embodiment, data comparison and inversion can be made concurrently between the 0-th and first groups of data and between the second and third groups of data. However, for the fourth and fifth groups of data, data comparison and inversion cannot be made concurrently with the 0-th to third groups of data. That is, the ninth embodiment requires a calculation time that is twice as long as the first embodiment. The tenth embodiment requires a calculation time that is substantially the same as that of the first embodiment and can reduce the in-phase power supply noise to ¼ as with the ninth embodiment.

To attain complete parallelism, it is required that a comparison between the number of 1 bits and the number of 0 bits in a fourth group of m/2 bits of data be made and outputs P6 and P7 be output during the time interval data comparison is made between the 0-th and first group of m/4 bits of data and the flag F1 is output. When F1=0, i.e., when the first group of data is not inverted, a multiplexer on the left side selects the m/2-bit data output and the flag information output P6 of an m/2-bit circuit A for on the left side.

When F1=1, i.e., when the first group of data is inverted, that multiplexer selects the m/2-bit data output and flag information output P7 of a circuit A on the right side.

The same operation is performed on the second and third groups of data. Flags P4 and P5 output from the multiplexers for the fourth and fifth groups of m/2 bits of data are XNORed and the inversion of the fifth group of data is controlled accordingly. Thus, the complete parallel operation can be implemented.

Most of delay is almost negligibly small with analog circuit configurations. Some delay is involved in making comparison in the circuits A, but little delay occurs with data inversion, XNORing, and multiplexing. Therefore, the present embodiment is substantially equal in the amount of delay to the first embodiment.

Eleventh Embodiment

Figure 15:
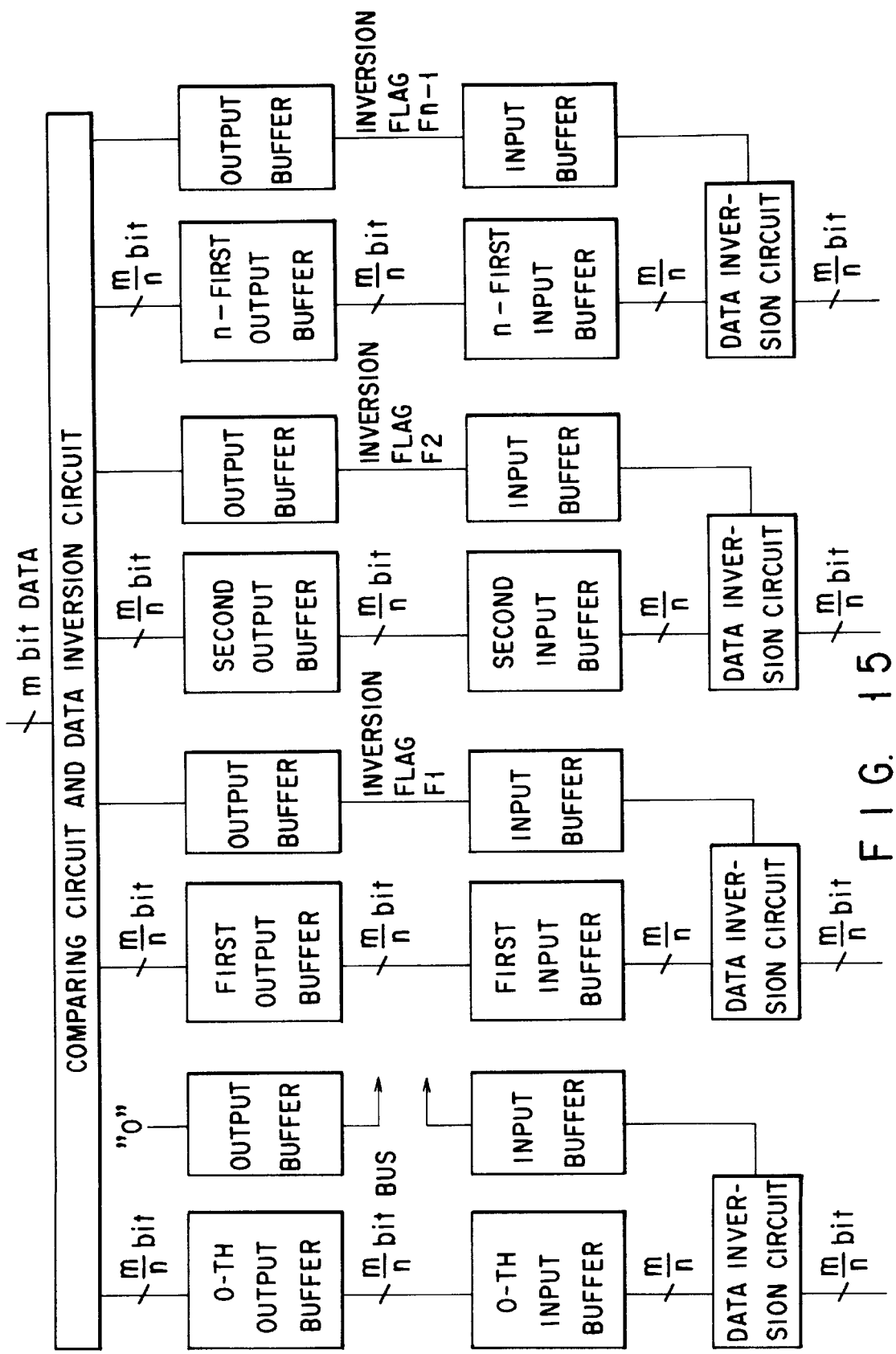
FIG. 15 shows an input/output device according to an eleventh embodiment.

FIG. 15 shows an eleventh embodiment of the present invention. In this embodiment, m-bit data is divided into 0-th to (n−1)st groups and an inversion flag is output for each group except the 0-th group. In addition, the input device receives data for each of n groups and a flag for each group except the 0-th group.

According to such an arrangement, the power supply noise can be reduced to about 1/n of that in the conventional device with the number of bus lines slightly increased to m+n−1. The data inverting algorithm may be same as or may differ from that in the previous embodiments. For example, the absolute value of (the number of 1s - the number of 0s) is calculated for each of n groups and then such absolute values for all the groups are arranged in the order of magnitude. Next, subtraction or addition is performed in the direction that the absolute value decreases. At this point, when the direction of subtraction or addition differs from the sign before the absolute value is taken, the inversion flag is set. To decrease the number of flag pins from n to n−1, the entire data is required to be inverted on the basis of the inversion flag for some group of data.

Twelfth Embodiment

FIGS. 16A and 16B shows a twelfth embodiment of the present invention. The present embodiment is an application of the invention to data communications between a memory and a CPU or the like.

In general, in a memory, data to be written and data to be read are the same. For this reason, as shown in FIG. 16A, the CPU which performs data processing transfers data with an inversion flag of the present invention, and the memory on the receive side receives the data and the flag information by a conventional receive circuit. The received data is stored without data restoration, and the received flag information is stored in a flag information memory. When the memory data is read out, a conventional transmit circuit in the memory transmits the data and the flag information as they were received to the CPU. The CPU receives the data and the flag information by a receive circuit of the present invention. In the receive circuit, the received data is restored to the original data by the use of the flag information. Thus, the power supply noise is reduced in data transfers from the CPU to the memory and from the memory to the CPU.

By extending above configuration, to which only CPU comprises a transmit/receive circuit and other device chips comprises conventional circuit having a flag memory for transmitting/receiving, power supply noise can be also reduced. The bus used in the invention may carry address data. In addition, data is not processed or restored at data transmission or reception, data may be processed/restored by an internal operation of CPU side or the like using a code including the flag information.

When the memory itself has a data processing function to prevent an increase in flag information memory and hence data is changed, both the CPU and the memory require the transmit and receive circuits of the invention as shown in FIG. 16B. The same applies to the case where data communications are made among many chips with buses of the same width.

Thirteenth Embodiment

Figure 17A:
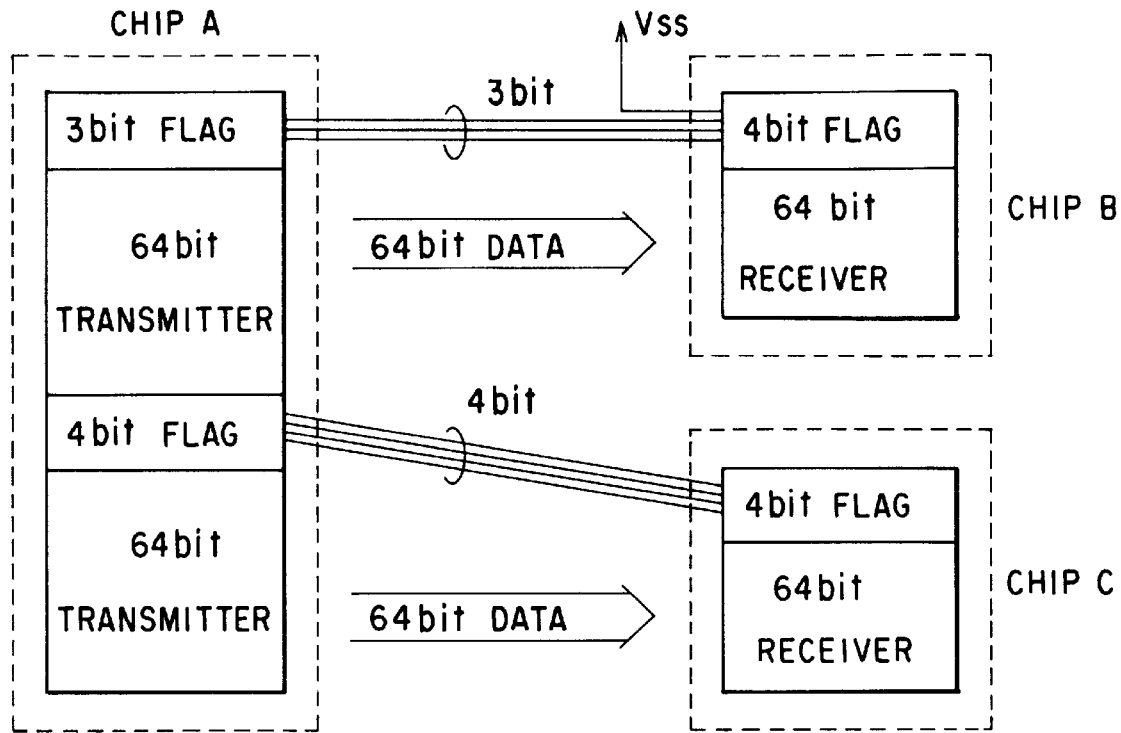
FIGS. 17A and 17B show another example of data connection between chips according to a thirteenth embodiment.

FIGS. 17A to 19 show a thirteenth embodiment of the present invention. This corresponds to the case where the bus width varies with chips. FIG. 17A shows an example in which a sending end (chip A) has a 128-bit bus and two receiving ends (chips B and C) have a 64-bit bus. In this example, in order to divide 128-bit data into eight for the purpose of reducing the power supply noise by a factor of eight, the sending end is required to have at least seven flags, which are to be allocated to the two receiving ends. This allocation is not so easy. However, this difficulty will be overcome by equipping only the receiving end with a data inversion circuit, an input buffer, and an input pin for the 0-th group of data as shown in FIGS. 13 to 15.

That is, it is required only that the chip B have its three flag pins connected to the chip A and the remaining one connected to ground and the chip C have its four flag pins connected to the chip A. Further, it is also possible to cope with a situation where the number of bits in the data group differs between the sending and receiving ends if the number of divisions of data at the receiving end is made twice or more larger than that at the sending end and the number of input flags is increased accordingly. That is, when the receiving end has many flag pins, it is allowed to connect a flag of the sending end to two or more flag pins of the receiving end.

Figure 17B:
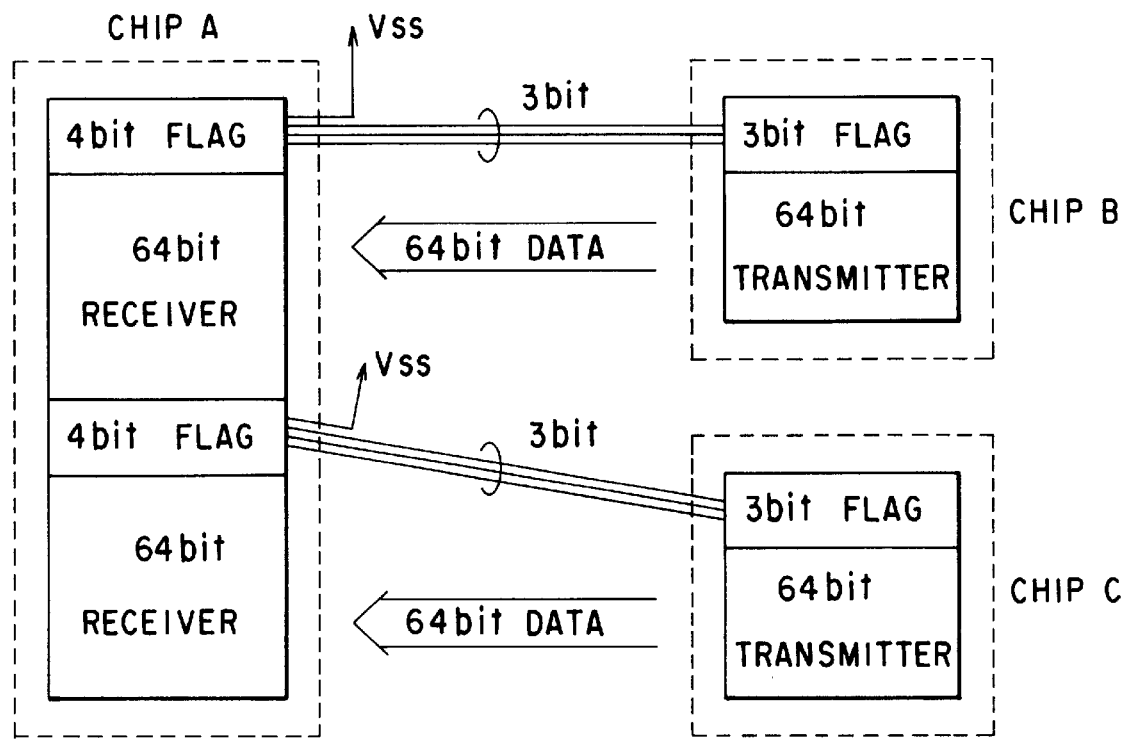

FIG. 17B shows an example of transfer in the opposite direction to that in FIG. 17A. In this case, the sending ends have a total of six flags. The receiving end is required to drop two of six flag pins to ground.

Figure 18A:
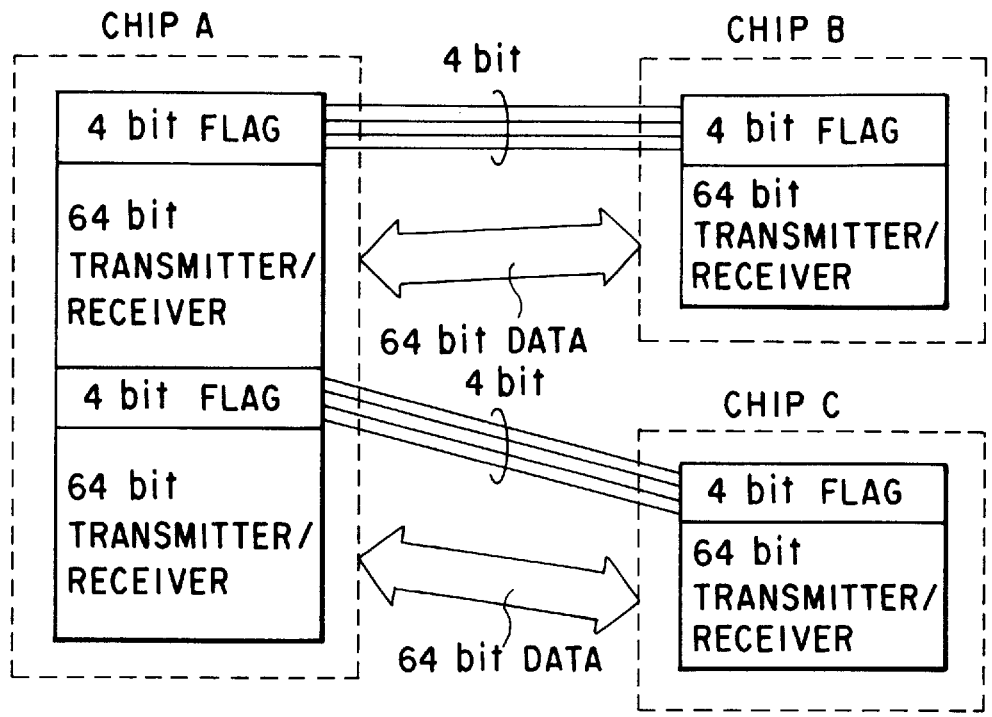
FIGS. 18A and 18B show still another example of data connection between chips according to the thirteenth embodiment.
Figure 18B:
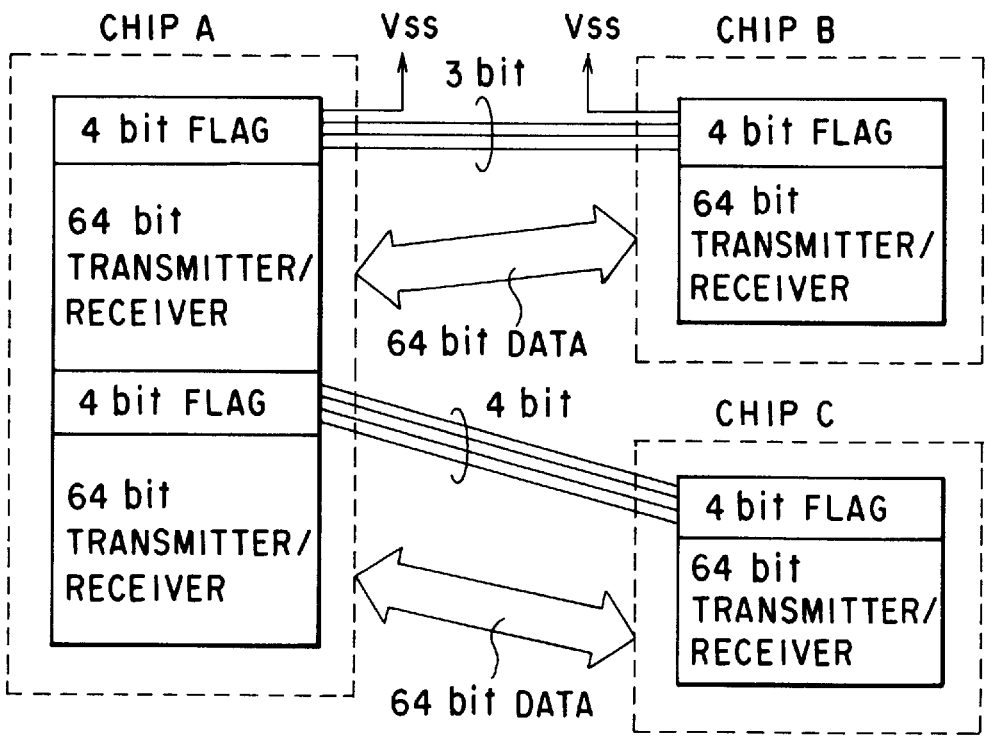
Figure 19:
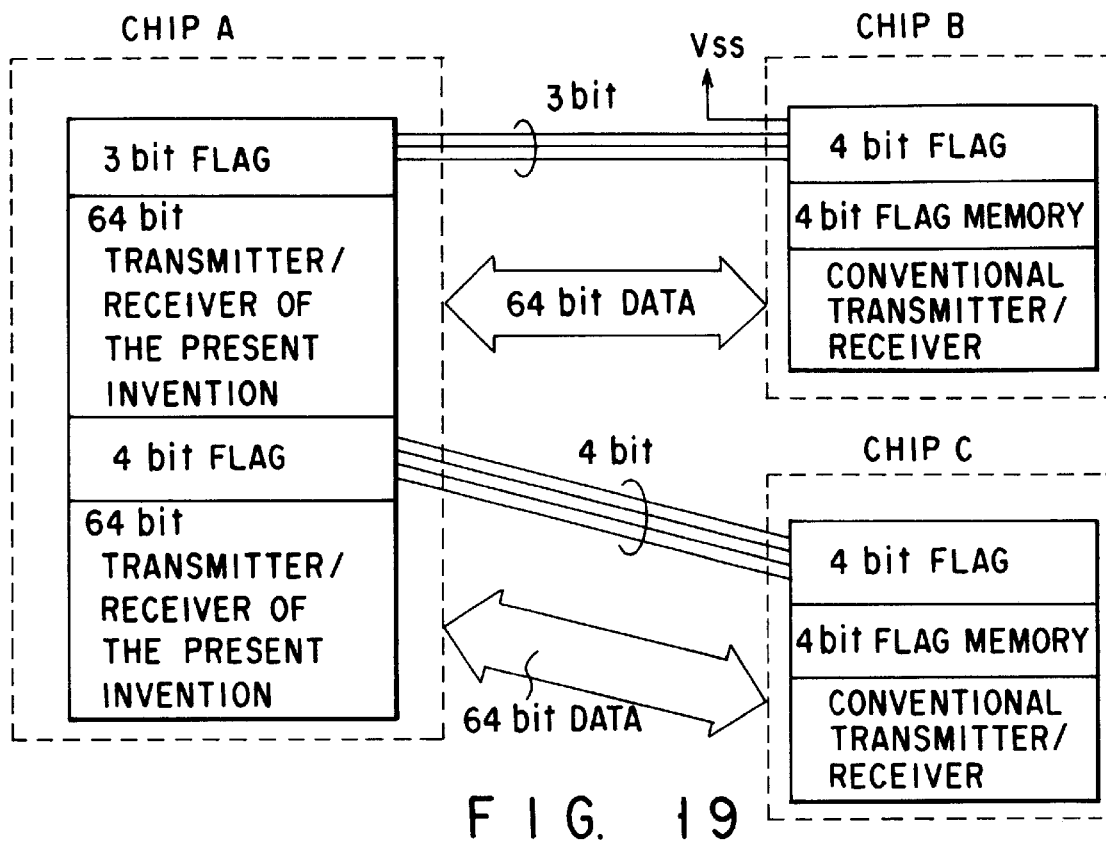
FIG. 19 shows a further example of data connection between chips according to the third embodiment.

FIG. 18A shows an example of a bidirectional bus. The chip A outputs/inputs eight flag bits for 128-bit bus and the chips B and C inputs/outputs four flag bits. In this example, the number of flags is obtained by exponentiation of two. In this case, the input and output flag pins for the 0-th data group are connected together. In FIG. 18B, the sending and receiving ends have the flag pins for the 0-th group data, but they are connected to Vss as opposed to being connected together. The chip A may have seven flags. FIG. 19 shows an example where the chip A alone has the transmitter/receiver of the present invention, and the chips B and C receive data and then outputs it as it was received as in the case of FIG. 16A. In this case as well, arrangements as shown in FIGS. 17A to 18B can be used. The chip A may be arranged to have eight flags.

Figure 20A:
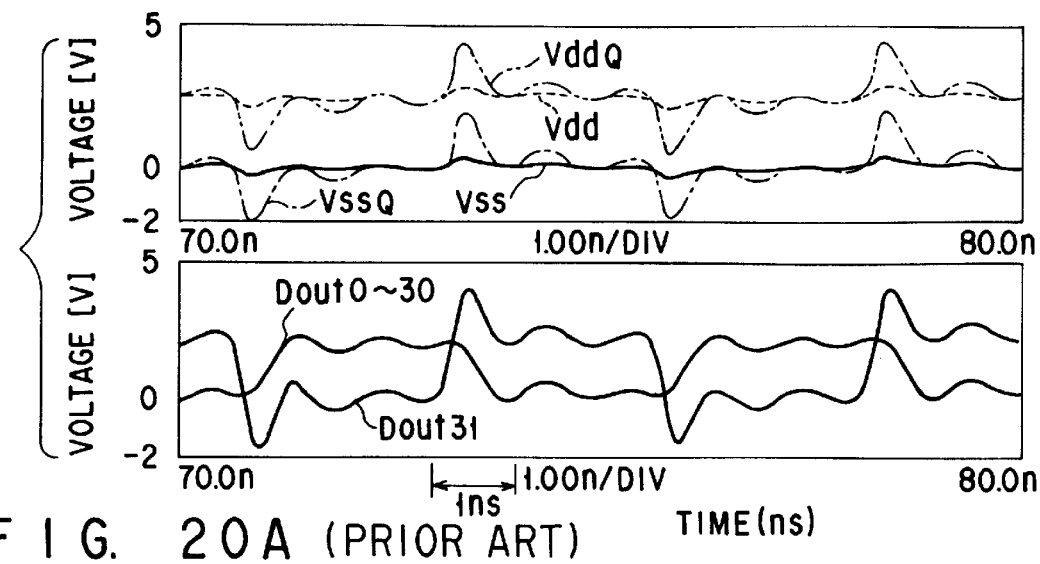
FIGS. 20A, 20B and 20C show simulation waveforms in the present invention and conventional devices.
Figure 20B:
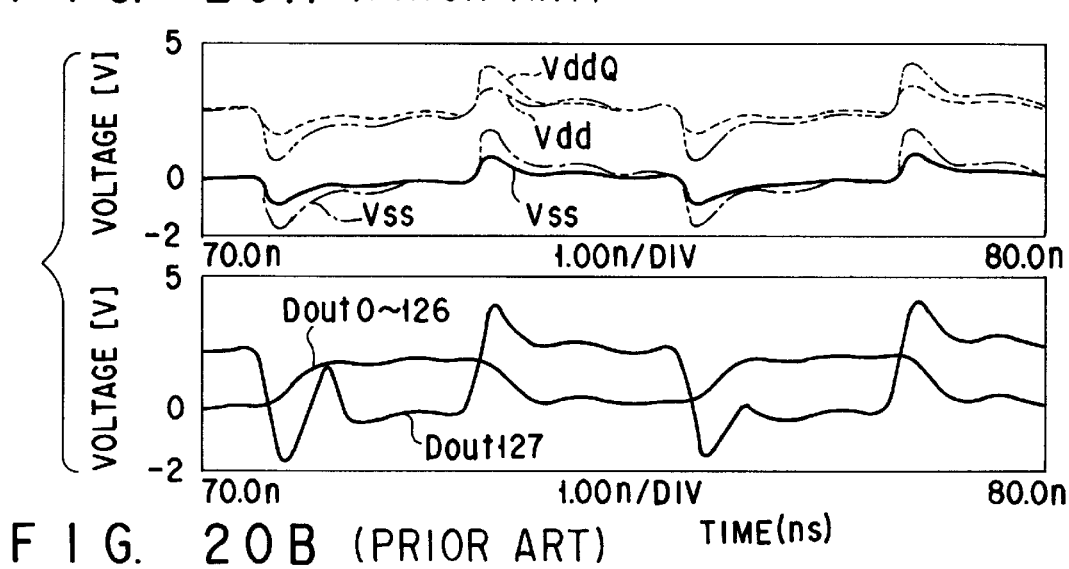
Figure 20C:
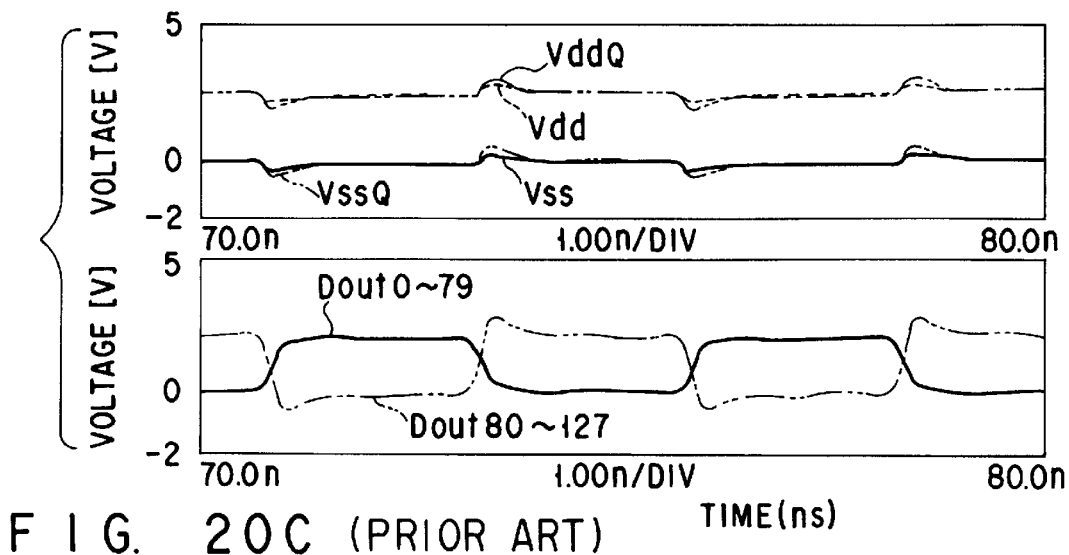

FIG. 20A to 20C show the results of simulation of the invention. In this case, the output device has dedicated power supply lines and pins (VddQ, VssQ) and the other internal circuitry has dedicated power supply lines and pins (Vdd, Vss). It is assumed that the parasitic inductance per pin is 10 nH and the parasitic inductance on the PCB is 0.3 nH.

Further, it is assumed that the capacitance of a stabilizing capacitor on the PCB is 1 microfarad, and the entire chip capacitance between Vcc and Vss is 10 nF. The VddQ and VssQ pins are provided every four I/O lines. The output I/O line is assumed to be a 10-cm transmission line. The line has a characteristic impedance of 50 ohms and is terminated by a 50-ohm resistor for impedance matching to eliminate the fluctuation of the line due to its associated parasitic inductance. The waveform on each I/O line is observed at a point on the output transistor side from which the influence of power supply noise can be seen. The operating clock frequency is 400 MHz.

FIG. 20A shows the results of simulation for a conventional 32-bit I/O configuration. The upper portion shows waveforms of the power supplies VddQ and VssQ for the output circuit and the power supplies Vdd and Vss for the internal circuitry. The lower portion shows output waveforms in which, of 32 bits, 31 bits (Dout0 to Dout30) are output in the same phase and one bit (Dout31) is output in the opposite phase. The fluctuation of VssQ and VddQ is great. Even when the power supply lines and pins (VddQ, VssQ) for the output circuit and the power supply lines and pins (Vdd, Vss) for the other circuit are separated, the noise of VddQ and VssQ is carried on the PCB to cause the other power supplies inside the chip to fluctuate. This is because the parasitic inductance is present on the PCB. The ringing of the data (Dout31) of the opposite phase is severe. Therefore, it is evident that the conventional system takes long to determine data.

FIG. 20B shows the case where the number of I/O lines is increased to 128 and the output bits are the same except one. In comparison with FIG. 20A, the noise of VddQ and VssQ is reduced, but the noise of Vcc and Vss is increased, causing malfunctions in the input buffer and the internal circuits. In addition, the ringing of the one bit of data of the opposite polarity at the rise time becomes more severe.

FIG. 20C shows the case where the number of bits of the same phase is 128/4+128/4×3/2=80, the number of bits of the opposite data is 128/4×3/2=48, and the number of bits that become in-phase without being offset, which corresponds to the worst case when data is divided into four. It will be understood that, as compared with the conventional 128-bit system, all the power supply noise is reduced to about 1/4 and the ringing of the I/O lines is almost eliminated. Further, it is understood that, as compared with the conventional 32-bit I/O system as well, noises of all the power supplies and all the waveforms are reduced.

In principle, the simulation of FIG. 20A and the simulation of FIG. 20C should exhibit the same level of noise. The reason why FIG. 20C is lower in noise level than FIG. 20A is that, even if the number of bits that operates in-phase without being offset is the same for FIGS. 20A and 20C, the VssQ and VddQ pins in FIG. 20C are larger in number than those in FIG. 20A and hence the effective package parasitic inductance is smaller since the VddQ and VssQ pins are provided every four I/O lines. In other words, since the present invention can decrease the number of power supply pins more than the conventional system, an increase in the number of flag pins can be offset. Thus, an input/output device can be arranged with a smaller number of pins.

Figure 21:
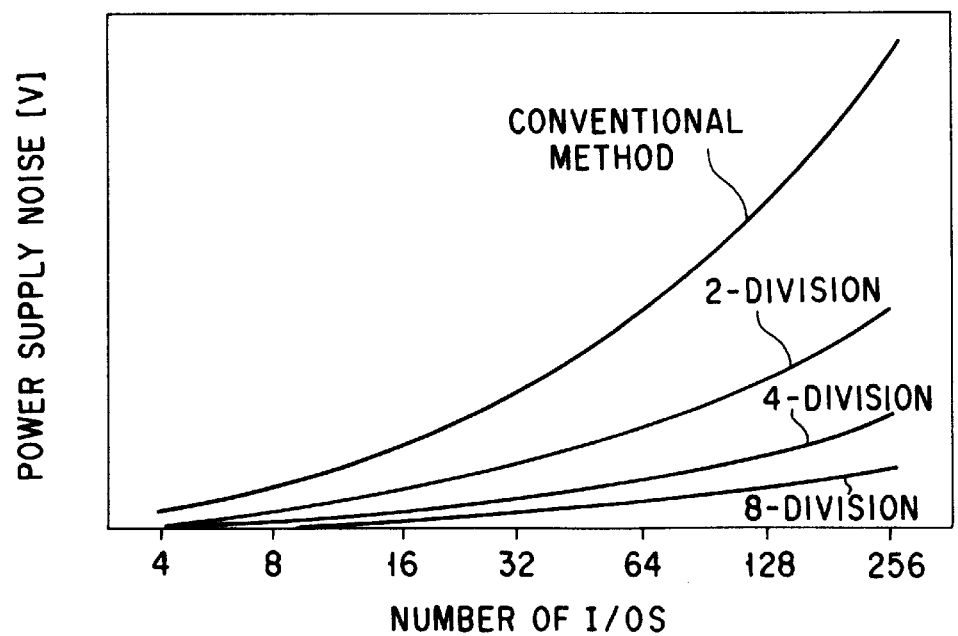
FIG. 21 shows the dependence of power supply noise on the number of I/O lines in the invention and conventional device.

FIG. 21 shows power supply noise level versus number of I/O lines for the conventional device and the present invention in which the number of divisions is 2, 4 and 8. According to the present invention, an input/output device can be implemented in which, as the number of data divisions increases, the level of power supply noise can be reduced even with the number of I/O lines increased. Memories, such as DRAMs, and system buses may have a parity bit every eight bits. In such a case, this extra one bit may be inserted into some data group. This will have a sufficient noise reducing effect as compared to the conventional system.

Fourteenth Embodiment

FIG. 22 shows a fourteenth embodiment of the present invention. The embodiments described so far are characterized in that, by dividing m-bit bus data into n groups, the in-phase power supply noise can be reduced to 1/n with an (n−1)-bit flag signal. This embodiment permits the in-phase noise to be reduced to 1/2n with an n-bit flag signal. The embodiment will be described in terms of n=2.

First, m-bit data is divided into 0-th and first groups. The groups of data are applied to m/2-bit comparators A which make a comparison between the numbers of 1s and 0s. A flag signal F2 is set to a 1 when both the comparator outputs P0 and P1 are 1s or 0s. When F2=1, all the bits in the first group are inverted. Then, all the bits in the entire data are applied to an m-bit comparator A. When 0 bits are more than 1 bits, the flag F1 is set to a 1, so that all the bits are inverted. When 1 bits are more than 0 bits, on the other hand, the flag F1 is set to a 0. In this case, all the bits are output as they are. That is, it is set such that the number of 1 bits is larger than the number of 0s.

In the present embodiment, the above-described relationship holds:

$|\text{(the number of 1s)}-\text{(the number of 0s)}| \leq m/2$

And moreover the following relationship holds:

$\text{(the number of 1s)}-\text{(the number of 0s)} \geq 0$

Thus, the following relationship holds:

$0 \leq \text{(the number of 1s)}-\text{(the number of 0s)} \leq m/2$

If this holds for current and previous output signals, then $0 \leq \text{(the current number of 1s)}-\text{(the current number of 0s)} \leq m/2$ $-m/2 \leq \text{(the previous number of 0s)}-\text{(the previous number of 0s)} < 0$ Thus, the following relationship holds:

$-m/2 \leq \text{(the current number of 1s)}-\text{(the current number of 0s)}+\text{(the previous number of 0s)}-\text{(the previous number of 0s)} \leq m/2$ Here, the current number of 1s can be resolved such that (the current number of 1s)=(the number of 1-to-1 bits)+(the number of 1-to-0 bits). Thus, the relationship holds $|\text{(the number of 0-to-1 bits)}-\text{(the number of 1-to-0 bits)}| \leq m/4$ That is, the in-phase power supply noise can be reduced to 1/4 with a flag signal of two bits.

The flag information F1 defines whether to invert the bits in the 0-th group data, while the flag information F2 defines whether to invert bits in the first group. F1 is set to a 1 when all the bits are to be inverted; otherwise, it is set to a 0. F2' is set to a 1 when only the first group is to be inverted in the preprocessing or when the entire data is inverted without inversion of the first group in the preprocessing. Thus, F2'=XOR (F1, F2). The input buffer inverts each group of data when the corresponding flag is 1, thereby restoring original data.

Fifteenth Embodiment

FIG. 23 shows a fifteenth embodiment of the present invention, which is distinct from the embodiment of FIG. 22 in that, when 1 bits are more than 1 bits, the flag F1 is set to a 1, so that all the m bits are inverted. When 0 bits are more than 0 bits, on the other hand, the flag F1 is set to a 0. In this case, all the m bits are output as they are. That is, it is set such that the number of 0 bits is larger than the number of 1s.

In the present embodiment, the above-described relationship holds:

$|\text{(the number of 1s)}-\text{(the number of 0s)}| \leq m/2$

And moreover the following relationship holds:

$\text{(the number of 1s)}-\text{(the number of 0s)} \leq 0$

Thus, the following relationship holds:

$-m/2 \leq \text{(the number of 1s)}-\text{(the number of 0s)} \leq 0$

If this holds for current and previous output signals, then the following relationship holds as with the embodiment of FIG. 22.

$|\text{(the number of 0-to-1 bits)}-\text{(the number of 1-to-0 bits)}| \leq m/4$ That is, the in-phase power supply noise can be reduced to 1/4 with a flag signal of only two bits.

Sixteenth Embodiment

Figure 24:
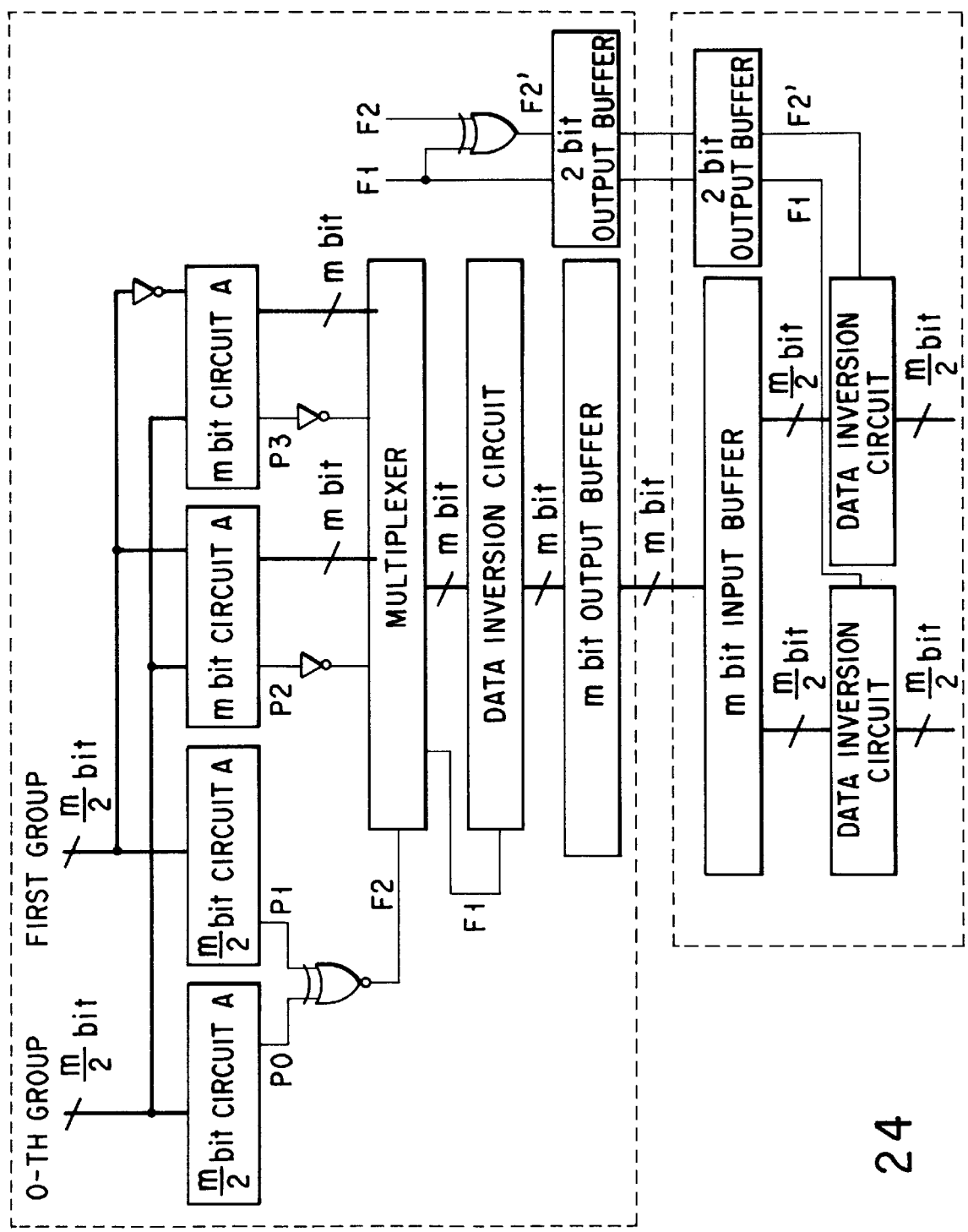
FIG. 24 shows an input/output device according to a sixteenth embodiment.

FIG. 24 shows a sixteenth embodiment of the present invention, which is an improvement on the embodiment of FIG. 22 to increase processing speed.

In order not for 1 bits or 0 bits in both the 0-th and first groups of data to predominate over the other, a decision is made as to whether the entire data has a larger number of 1 bits or 0 bits before the result of the flag signal F1 is output irrespective of whether the first group is to be inverted or not. Either the 0-th group or the first group is selected by the multiplexer in response to the result of the flag signal F1. After that, if 0 bits are predominate in the data selected by the multiplexer, then all the bits are inverted so that 1 bits will become predominant all the time. Thus, the same level of noise reduction as the embodiment of FIG. 22 can be attained with reduced processing time.

Seventeenth Embodiment

Figure 25:
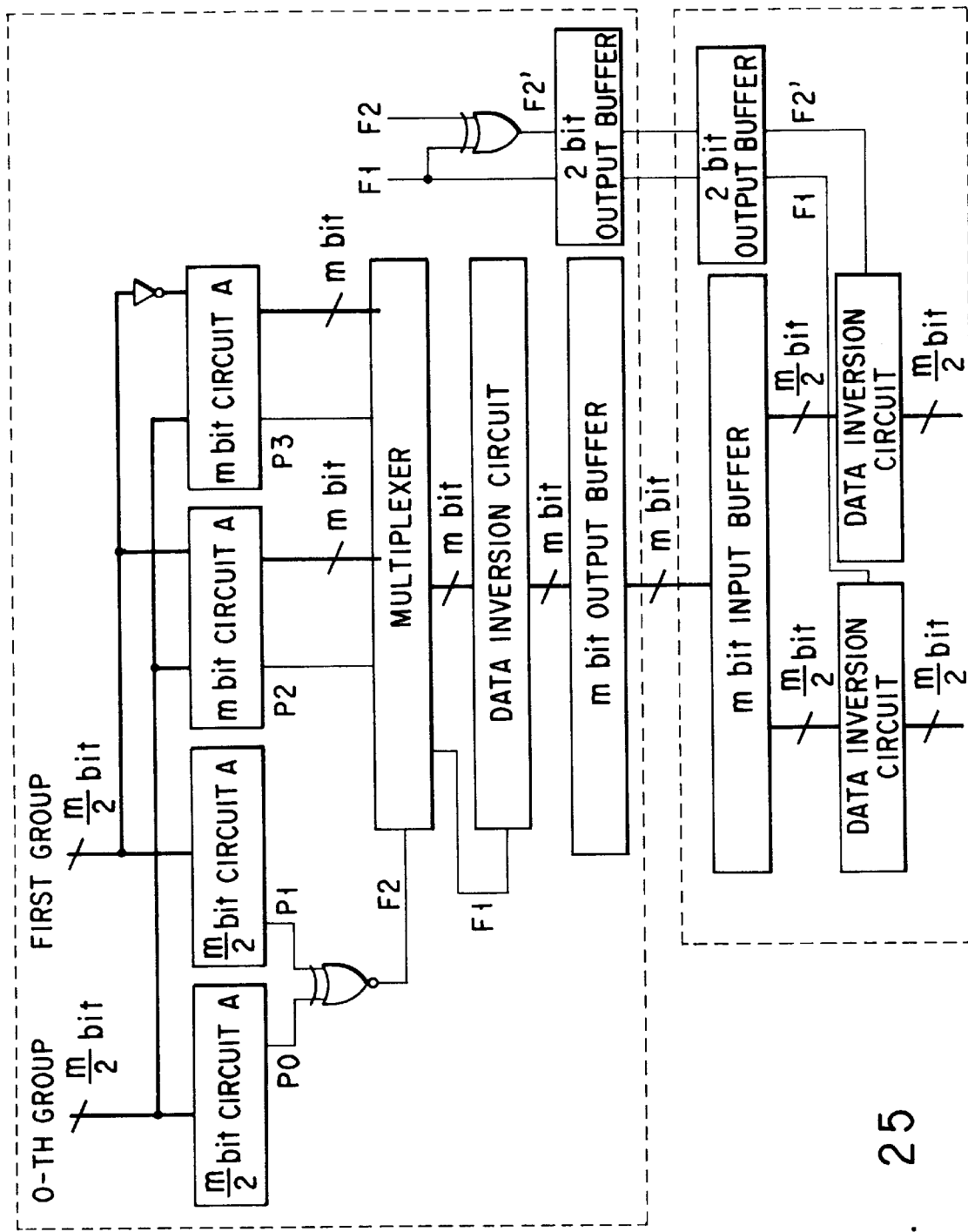
FIG. 25 shows an input/output device according to a seventeenth embodiment.

FIG. 25 shows a seventeenth embodiment of the present invention, which is an improvement on the embodiment of FIG. 23 to increase processing speed.

In order not for 1 bits or 0 bits in both the 0-th and first groups of data to predominate over the other, a decision is made as to whether the entire data has a larger number of 1 bits or 0 bits before the result of the flag signal F1 is output irrespective of whether the first group is to be inverted or not. Either the 0-th group or the first group is selected by the multiplexer in response to the result of the flag signal F1. After that, if 1 bits are predominate in the data selected by the multiplexer, then all the bits are inverted so that 0 bits will become predominant all the time. Thus, the same level of noise reduction as the embodiment of FIG. 23 can be attained with reduced processing time.

Eighteenth Embodiment

Figure 26:
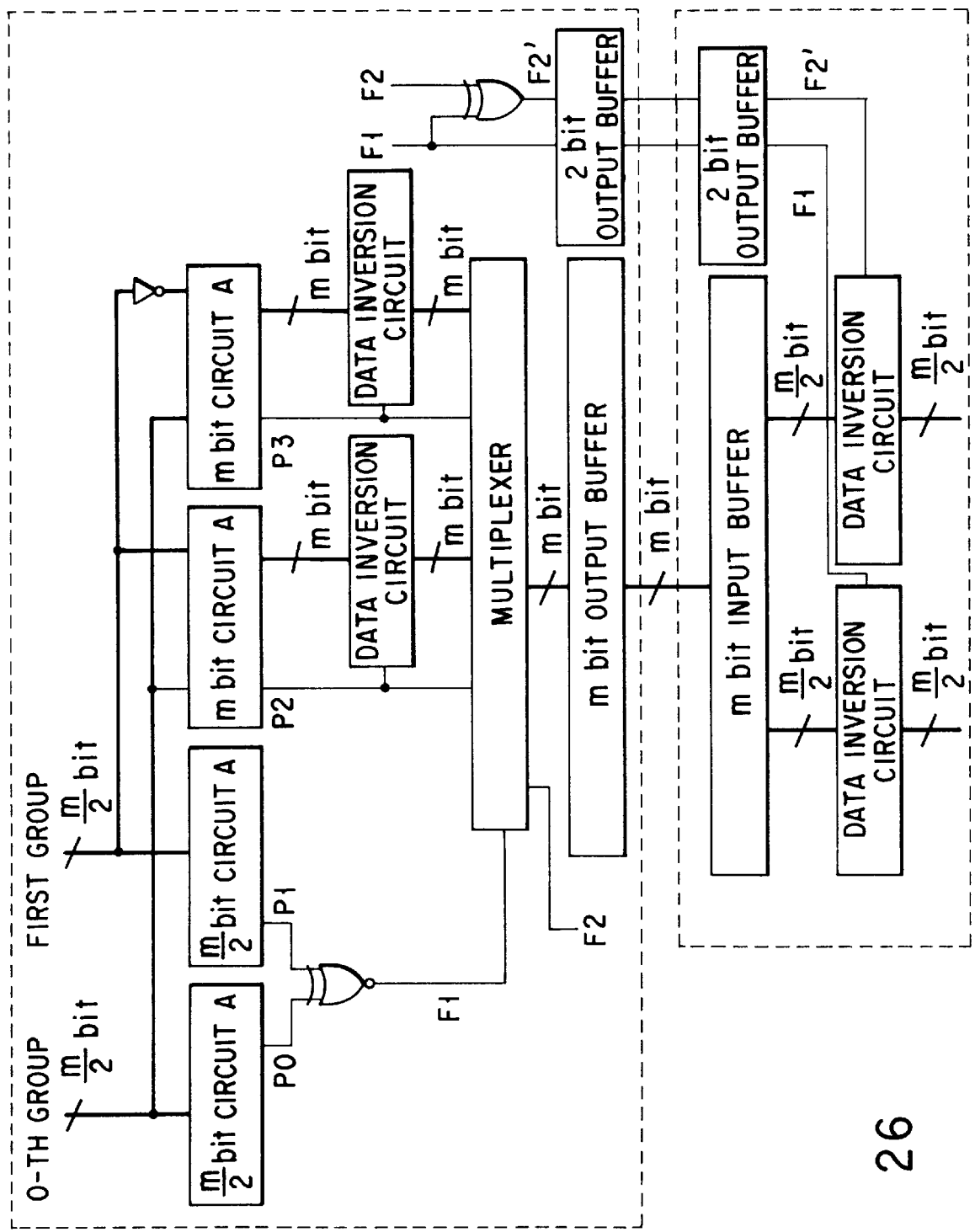
FIG. 26 shows an input/output device according to an eighteenth embodiment.

FIG. 26 shows an eighteenth embodiment of the present invention, which is a modification of the embodiment of FIG. 25. In this embodiment, an all-bit inversion circuit is interposed between each m-bit comparator circuit A and the multiplexer.

Nineteenth Embodiment

Figure 27:
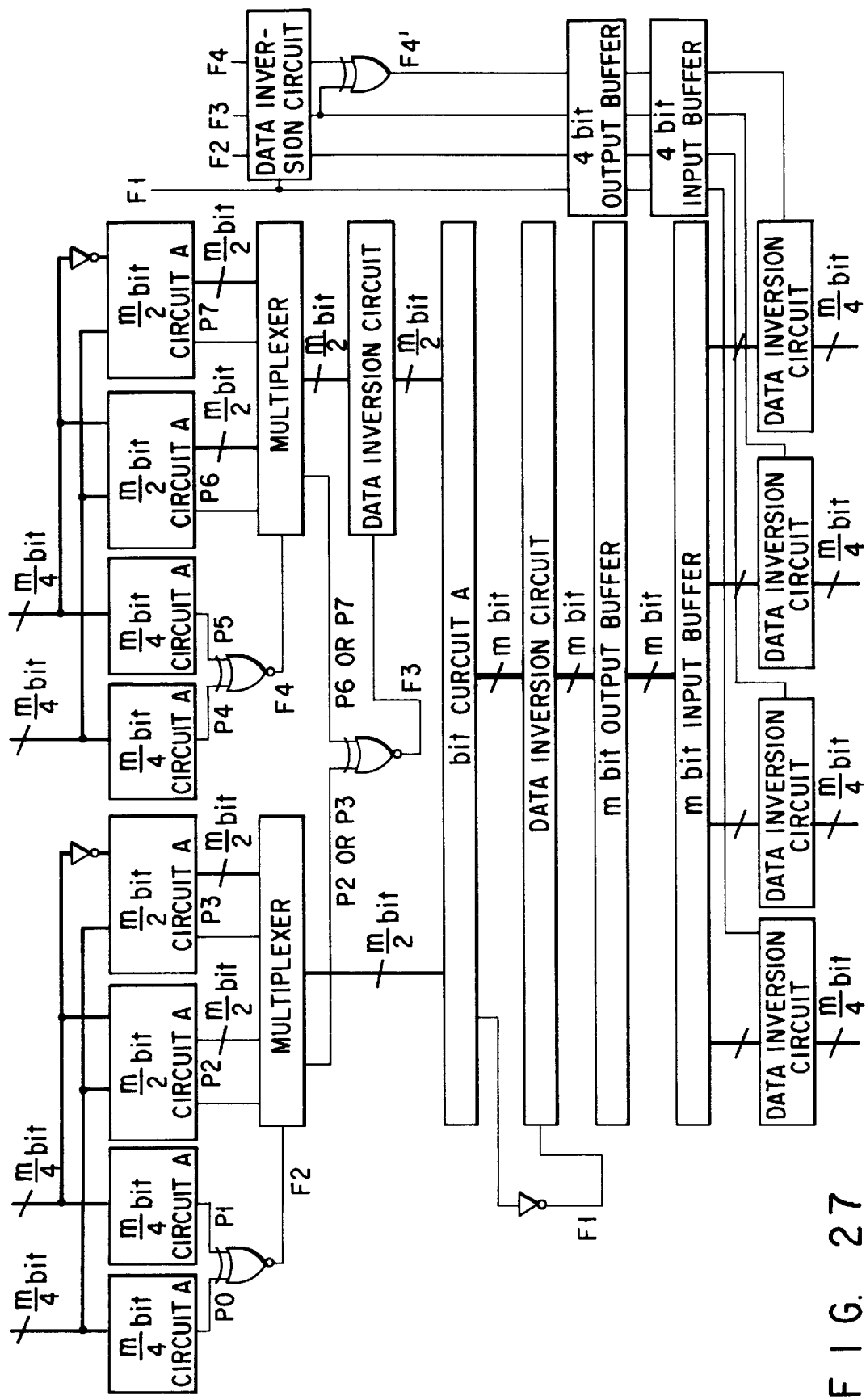
FIG. 27 shows an input/output device according to a nineteenth embodiment.

FIG. 27 shows a nineteenth embodiment of the present invention. In this embodiment, m-bit data which has been subjected to partial inversion in the manner shown in FIG. 14 is applied to an m-bit comparator A. When 0 bits are larger in number than 1 bits in the m-bit data, the flag F1 is set to a 1, so that the entire m-bit data is inverted. When 1 bits are larger, on the other hand, the flag F1 is set to F1=0. In this case, the m-bit data is output as it is. That is, 1 bits are always made predominant over 0s.

In the present embodiment, the above-described relationship holds:

$$|(\text{the number of 1s})-(\text{the number of 0s})| \leq m/4$$

And moreover the following relationship holds:

$$(\text{the number of 1s})-(\text{the number of 0s}) \geq 0$$

Thus, the following relationship holds:

$$|\text{the number of 0-to-1 bits})-(\text{the number of 1-to-0 bits})| \leq m/8$$

That is, the in-phase power supply noise can be reduced to 1/8 with a flag signal of only four bits. When F1=1, that is, when all the bits are to be inverted, the flags F2, F3 and F4, indicating the results of preprocessing, are also required to be inverted.

According to this embodiment, when m-bit data is divided into n groups, the power supply noise can be reduced to 1/2n with n-bit flag information.

Twentieth Embodiment

Figure 28:
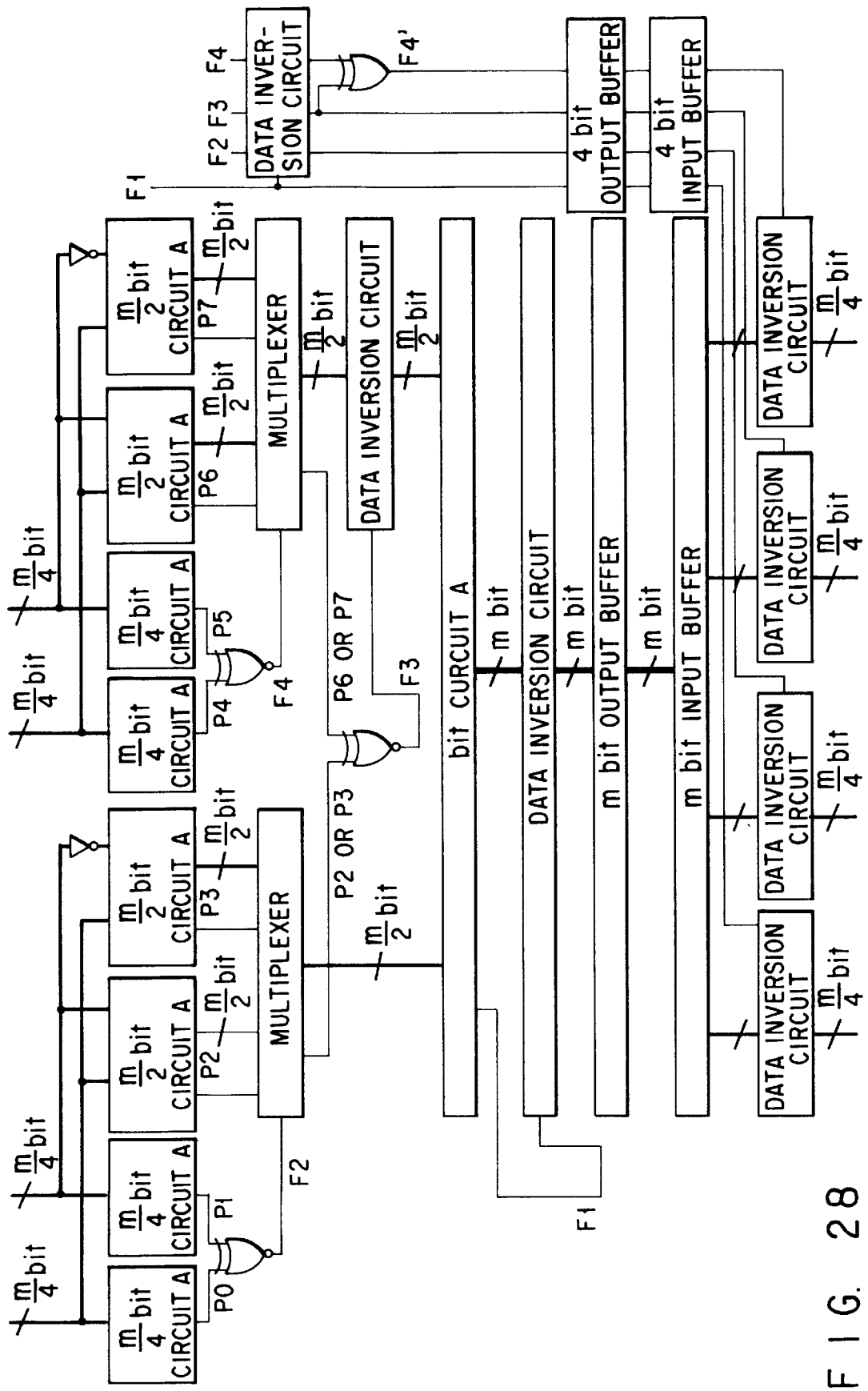
FIG. 28 shows an input/output device according to a twentieth embodiment.

FIG. 28 shows a twentieth embodiment of the present invention. In this embodiment, m-bit data which has been subjected to partial inversion in the manner shown in FIG. 14 is applied to an m-bit comparator A. When 1 bits are larger in number than 0 bits in the m-bit data, the flag F1 is set to a 1, so that the entire m-bit data is inverted. When 0 bits are larger, on the other hand, the flag F1 is set to F1=0. In this case, the m-bit data is output as it is. That is, 0 bits are always made predominant over 0s.

In the present embodiment, the above-described relationship holds:

$$|(\text{the number of 1s})-(\text{the number of 0s})| \leq m/4$$

And moreover the following relationship holds:

$$(\text{the number of 1s})-(\text{the number of 0s}) \geq 0$$

Thus, the following relationship holds:

$$|(\text{the number of 0-to-1 bits})-(\text{the number of 1-to-0 bits})| \leq m/8$$

That is, the in-phase power supply noise can be reduced to 1/8 with a flag signal of only four bits as with the embodiment of FIG. 27. When F1=1, that is, when all the bits are to be inverted, the flags F2, F3 and F4, indicating the results of preprocessing, are also required to be inverted.

According to this embodiment, when m-bit data is divided into n groups, the power supply noise can be reduced to 1/2n with n-bit flag information.

Figure 29:
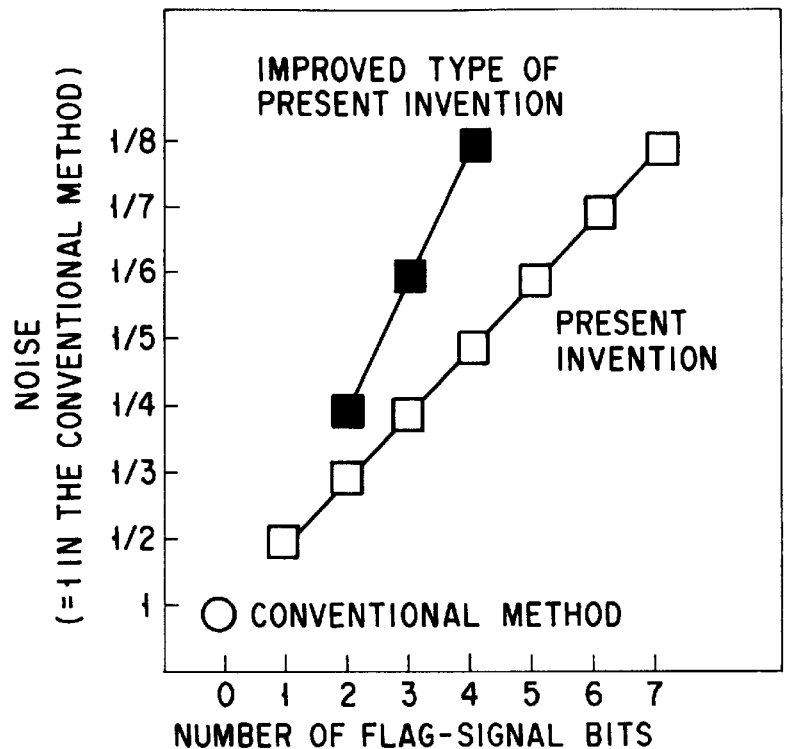
FIG. 29 shows the number of flag signals versus the amount of noise with the amount of noise in the conventional device taken as unity.

FIG. 29 shows the number of flag signals versus the amount of noise with the amount of noise in the conventional method taken as unity to exhibit the advantage of the present invention. In the embodiments of the invention shown in FIGS. 3, 13, 14 and 15, the power supply noise is reduced to 1/n with (n−1)-bit flag information, while, in the further improved embodiments shown in FIGS. 22 to 28, the power supply noise can be reduced to 1/2n with n-bit flag information. With a function of simply deciding whether either 1s or 0s are predominant in entire data and inverting the entire data so that 1s or 0s are always predominant, it is difficult to reduce the power supply noise to 1/2 or below. As shown in FIGS. 22 to 28, partial data inversion and total data inversion can be combined to maximize the noise reducing effect.

Twenty-First Embodiment

Figure 30:
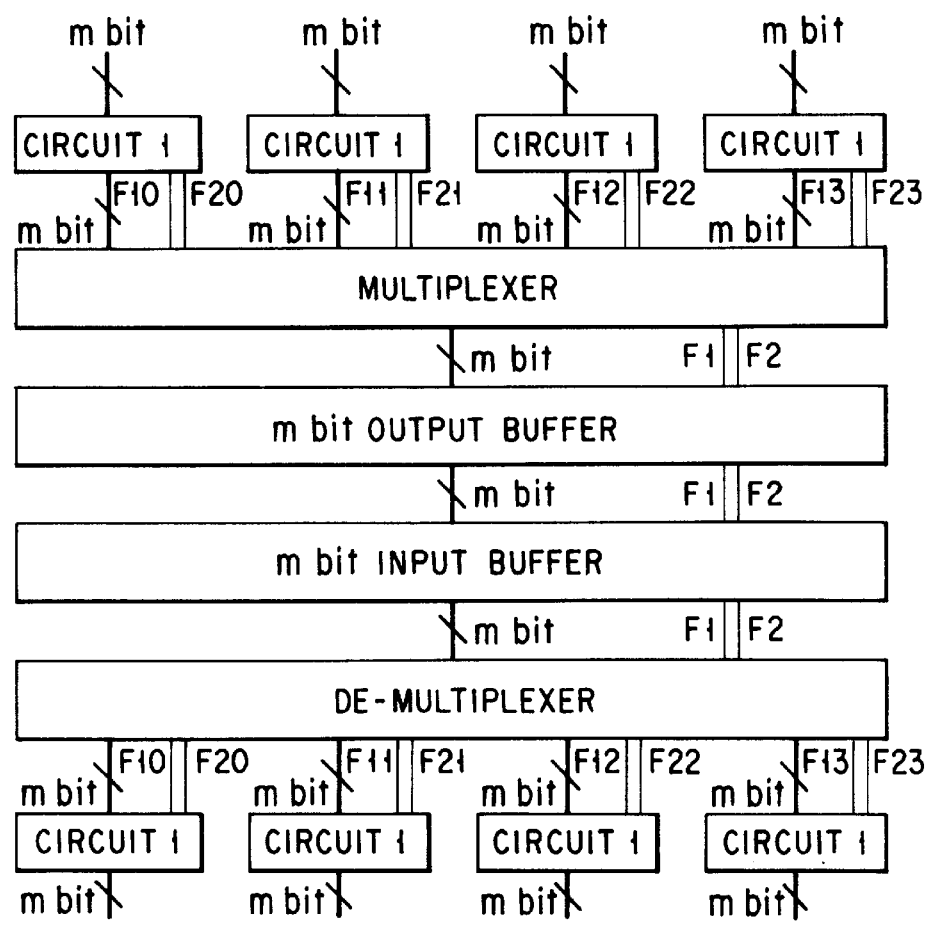
FIG. 30 shows an example of data connection between chips according to a twenty-first embodiment.

FIG. 30 shows a twenty-first embodiment of the present invention. The first to twentieth embodiments described so far involve an increase in overhead corresponding to processing time even with parallel operation as compared with the conventional method. In FIG. 30, there are provided a plurality of circuits 1 each of which corresponds the data processing circuitry on the output side shown in FIGS. 3 to 28. In the circuits 1, processing is performed concurrently. The outputs of the circuits and flag information are sequentially output to I/O lines by a multiplexer on a time division basis. On the input side, the multiplexer output is demultiplexed by a demultiplexer for application of the output of each of the circuits 1 to a corresponding one of circuits 2, which correspond to the data processing circuitry on the input side in FIGS. 3 to 28. Thus, original data is restored by concurrent processing. In this embodiment, the concurrent processing permits data processing time to be reduced to 1/4. In general, the processing time can be reduced to 1/k with concurrent processing of k groups of data.

Twenty-Second Embodiment

Figure 31A:
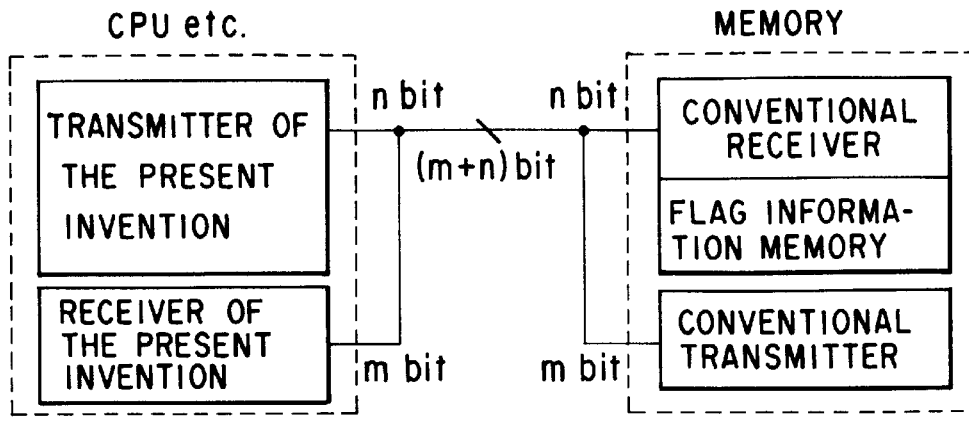
FIGS. 31A, 31B and 31C show examples of data connection between chips according to a twenty-second embodiment.
Figure 31B:
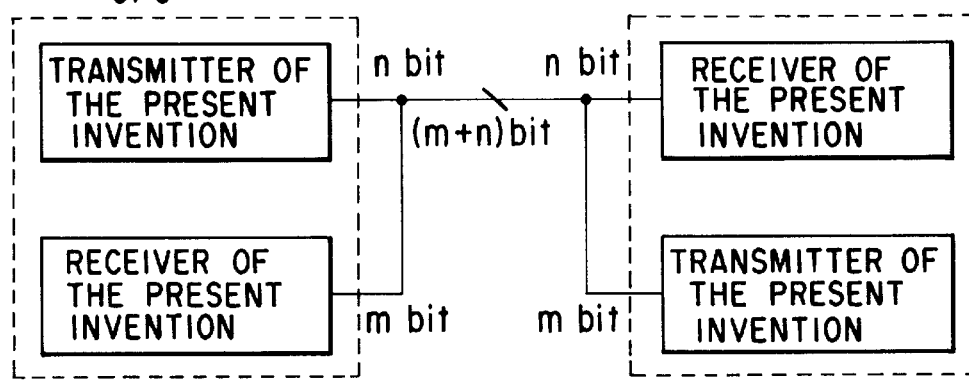
Figure 31C:
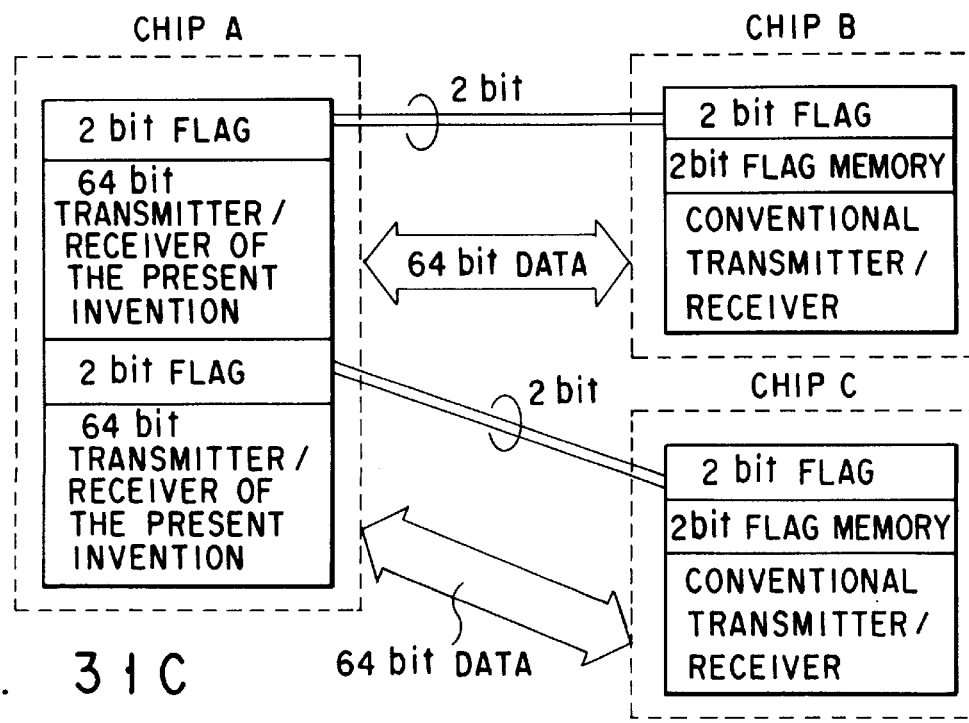

FIGS. 31A and 31B show a twenty-second embodiment of the present invention. Applications of the embodiments of FIGS. 3, 13, 14 and 15 are shown in FIGS. 16A to 19. Likewise, FIGS. 31A to 31C show applications of the embodiments of FIGS. 22 to 30.

FIG. 31A shows an example for m-bit data and n-bit flag information. The CPU is equipped with an input/output device of the present invention and the memory is equipped with a conventional (m+n)-bit input/output device. At the time of data transfer from the CPU to the memory, the memory stores data subjected to data processing and flag information as they are. At the time of data transfer from the memory to the CPU, the stored data and flag information are transferred as they are.

FIG. 31B shows the case where the CPU and the memory each have an input/output device of the present invention. Both the arrangements of FIGS. 31A and 31B permit the power supply noise to be reduced to 1/2n. FIG. 31C shows a connection between chips having different bus widths, which is a modification of the arrangement of FIG. 31B. That is, this arrangement handles 128-bit data and 4-bit flag information and thus reduces the power supply noise to 1/4.

Although the preferred embodiments of the invention have been disclosed and described, it is apparent that other embodiments and modifications are possible.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A device comprising:
   in-chip data lines of an m-bit configuration for transferring m-bit data containing 1 bits and/or 0 bits, wherein m is an integer of 8 or more;
   m in-chip output circuits for respectively outputting m bits on the in-chip data lines to m external output pins;
   decision means provided for each of n groups into which the in-chip data lines and the in-chip output circuits are divided, wherein n is an integer of 2 or more, said decision means each deciding whether all bits on each of the n groups of data lines are to be inverted or not on the basis of the m-bit data, and further wherein the decision means includes means for deciding whether data is to be inverted or not by means of a parallel combination of first transistors having their gates connected to receive positive-logic data and a parallel combination of second transistors having their gates connected to receive negative-logic data;
   data inversion circuits provided between the in-chip data lines and the in-chip output circuits in each of at least of said groups and responsive to an output of an associated decision means for inverting all bits in data on the corresponding in-chip data lines;
   inversion information output circuits for outputting to external output pins information indicating whether data in the groups have been inverted or not; and
   further wherein the decision means decides whether data is to be inverted or not on the basis of the result of amplification of a potential difference produced at drain electrodes of the first and second transistors by a difference between driving currents of the first and second transistors.

2. A device comprising:
   in-chip data lines of an m-bit configuration for transferring m-bit data containing 1 bits and/or 0 bits, wherein m is an integer of 8 or more;
   m in-chip output circuits for respectively outputting m bits on the in-chip data lines to m external output pins;
   decision means provided for each of n groups into which the in-chip data lines and the in-chip output circuits are divided, wherein n is an integer of 2 or more, said decision means each deciding whether all bits on each of the n groups of data lines are to be inverted or not on the basis of the m-bit data, and further wherein the decision means includes means for deciding whether data is to be inverted or not by means of a parallel combination of first transistors having their gates connected to receive positive-logic data and a parallel combination of second transistors having their gates connected to receive negative-logic data;
   data inversion circuits provided between the in-chip data lines and the in-chip output circuits in each of at least of said groups and responsive to an output of an associated decision means for inverting all bits in data on the corresponding in-chip data lines;
   inversion information output circuits for outputting to external output pins information indicating whether data in the groups have been inverted or not; and
   further wherein a resistor is connected in series with each of the transistors.

3. A device comprising:
   in-chip data lines of an m-bit configuration for transferring m-bit data containing 1 bits and/or 0 bits, wherein m is an integer of 8 or more;
   m in-chip output circuits for respectively outputting m bits on the in-chip data lines to m external output pins;
   decision means provided for each of n groups into which the in-chip data lines and the in-chip output circuits are divided, wherein n is an integer of 2 or more, said decision means each deciding whether all bits on each of the n groups of data lines are to be inverted or not on the basis of the m-bit data;
   data inversion circuits provided between the in-chip data lines and the in-chip output circuits in each of at least of said groups and responsive to an output of an associated decision means for inverting all bits in data on the corresponding in-chip data lines;
   inversion information output circuits for outputting to external output pins information indicating whether data in the groups have been inverted or not; and
   wherein the decision means includes a series combination of parallel-connected pMOS transistors and parallel-connected nMOS transistors having their gates connected to receive positive-logic data and a series combination of parallel-connected nMOS transistors and parallel-connected pMOS transistors having their gates connected to receive negative-logic data.

4. The device according to claim 3, wherein each of the decision means decides whether data is to be inverted or not on the basis of the result of amplification of a difference in potentials produced at intermediate nodes of the series combinations of the parallel-connected MOS transistors.

5. The device according to claim 3, wherein a resistor is connected in series with each of the MOS transistors.

6. The device according to claim 5, wherein the number of bits of each of the n groups is m/n.

7. A system comprising devices as claimed in claim 5, and further comprising at least one of an MPU, a memory controller, a system bus, and a circuit board.

8. The device according to claim 6, wherein m bits of data simultaneously output from the m in-chip output circuits satisfy the condition that the number of 1 bits−the number of 0 bits≦m/n.

9. The device according to claim 6, wherein each of the decision means includes a decision circuit for deciding which of 1 bits and 0 bits in data in the corresponding group are larger in number;
   an inversion circuit for inverting all bits in data for one of groups when 1 bits or 0 bits are predominant over 0 bits or 1 bits in each of the groups.

10. A system comprising devices as claimed in claim 6, and further comprising at least one of an MPU, a memory controller, a system bus, and a circuit board.

11. The device according to claim 6, wherein m bits of data simultaneously output from the m in-chip output circuits satisfy the condition that $0 \leq$ the number of 1 bits−the number of 0 bits $\leq m/n$.

12. The device according to claim 6, wherein m bits of data simultaneously output from the m in-chip output circuits satisfy the condition that $-m/n \leq$ the number of 1 bits−the number of 0 bits $\leq 0$.

13. The device according to claim 6, wherein, when the m in-chip output circuits output sets of m bits of data successively, two successive sets of m bits of data output from the m in-chip output circuits satisfy the condition that |the number of bits each of which has made a transition from a 0 to a 1−the number of bits each of which has made a transition from a 1 to a 0| $\leq m/2n$.

14. The device according to claim 6, wherein each of the decision means includes a first decision circuit for deciding which of 1s and 0s in each group of data are larger in number; a first inversion circuit for inverting all bits in data for one of groups when 1 bits or 0 bits are larger in number than 0 bits or 1 bits in each of the groups; a second decision circuit for deciding which of 1s and 0s in m bits of data of output of the first inversion circuit are larger in number; and a second inversion circuit for inverting all bits in the m bits of data when it is decided by the second decision circuit that 1 bits are larger in number than 0s.

15. The device according to claim 6, wherein each of the decision means includes a first decision circuit for deciding which of 1s and 0s in each group of data are larger in number; a first inversion circuit for inverting all bits in data for one of groups when 1 bits or 0 bits are larger in number than 0 bits or 1 bits in each of the groups; a second decision circuit for deciding which of 1s and 0s in m bits of data of output of the first inversion circuit are larger in number; and a second inversion circuit for inverting all bits in the m bits of data when it is decided by the second decision circuit that 0 bits are larger in number than 1s.

* * * * *